(12) United States Patent
Nakada

(10) Patent No.: US 12,462,141 B2
(45) Date of Patent: Nov. 4, 2025

(54) MACHINE LEARNING DEVICE, MACHINE LEARNING PROGRAM, AND MACHINE LEARNING METHOD

(71) Applicant: TDK CORPORATION, Tokyo (JP)

(72) Inventor: Kazuki Nakada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 988 days.

(21) Appl. No.: 17/558,129

(22) Filed: Dec. 21, 2021

(65) Prior Publication Data

US 2022/0114418 A1    Apr. 14, 2022

Related U.S. Application Data

(63) Continuation-in-part of application No. PCT/JP2019/025880, filed on Jun. 28, 2019.

(51) Int. Cl.
*G06N 3/044* (2023.01)

(52) U.S. Cl.
CPC .................... *G06N 3/044* (2023.01)

(58) Field of Classification Search
CPC ................. G06N 3/044; G06N 3/08
See application file for complete search history.

(56) References Cited

U.S. PATENT DOCUMENTS

| | | | | |
|---|---|---|---|---|
| 10,168,159 | B2 * | 1/2019 | Ribeiro | G06F 17/16 |
| 10,572,802 | B1 * | 2/2020 | Sun | G06N 7/01 |
| 12,287,393 | B1 * | 4/2025 | Davidson | G01S 13/72 |
| 2018/0158552 | A1 * | 6/2018 | Liu | G06N 3/044 |
| 2021/0264242 | A1 * | 8/2021 | Canaday | G06N 3/063 |

OTHER PUBLICATIONS

A. Jalalvand, G. Van Wallendael and R. Van De Walle, "Real-Time Reservoir Computing Network-Based Systems for Detection Tasks on Visual Contents," 2015 7th International Conference on Computational Intelligence, Communication Systems and Networks, Riga, Latvia, 2015, pp. 146-151 (Year: 2015).*

Bianchi et al., "Reservoir computing approaches for representation and classification of multivariate time series, " Nov. 6, 2018, pp. 1-29.

(Continued)

*Primary Examiner* — Ajay M Bhatia
(74) *Attorney, Agent, or Firm* — Oliff PLC

(57) ABSTRACT

A machine learning device performing online learning of input data of one or more dimensions aligned in a predetermined order using a recurrent neural network having a plurality of nodes connected by edges to which weights are assigned performs an output data generating process and a weight updating process every time the input layer receives the input data of one or more dimensions in the predetermined order, in which, the weight updating process is a process in which a weight assigned to each edge connecting a 1st intermediate node and a 2nd intermediate node and a weight assigned to each edge connecting a 2nd intermediate node and an output node are updated using an equation derived based on an extended Kalman filter method, 1st intermediate data of one or more dimensions, and output data of one or more dimensions.

4 Claims, 12 Drawing Sheets

(56) References Cited

OTHER PUBLICATIONS

Babinec et al., "Merging Echo State and Feedforward Neural Networks for Time Series Forecasting," International Conference on Artificial Neural Networks ICANN 2006, 2006, pp. 367-375.
Maass et al., "Real-Time Computing Without Stable States: A New Framework for Neural Computation Based on Perturbations," Neural Computation, 2002, vol. 14, pp. 2531-2560.
Katori, Yuichi, "Encoding Multi-Dimensional Time Series Data with Reservoir Computing," 2016 International Symposium on Nonlinear Theory and Its Applications, NOLTA 2016, Nov. 27-30, 2016, Yugawara, Japan, pp. 275-278.
Rizal et al., "Recurrent Neural Network with Extended Kalman Filter for Prediction of the Number of Tourist Arrival in Lombok," 2016 International Conference on Informatics and Computing (ICIC), 2016.
"Kalman Filtering and Neural Networks," Adaptive and Learning Systems for Signal Processing, Communications, and Control, Ed. Simon Haykin, 2001, 284 pages.
Sussillo et al., "Generating Coherent Patterns of Activity from Chaotic Neural Networks," Neuron, Aug. 27, 2009, vol. 63, pp. 554-557.
Duane, Gregory S., "'Force' learning in recurrent neural networks as data assimilation," CHAOS, 2017, vol. 27, pp. 126804-1-126804-8.
Aug. 6, 2019 International Search Report issued in International Patent Application No. PCT/JP2019/025880.

\* cited by examiner

MACHINE LEARNING DEVICE, MACHINE LEARNING PROGRAM, AND MACHINE LEARNING METHOD

TECHNICAL FIELD

The present invention relates to a machine learning device, a machine learning program, and a machine learning method.

BACKGROUND ART

As a method for performing machine learning of time series data, a method using a recurrent neural network is known (see Non-Patent Literatures 1 to 3).

However, in such a method, machine learning of a multi-dimensional time series data which correlated each other cannot be performed. Thus, as a method for performing machine learning of the time series data, a method using a neural network including a recurrent reservoir layer and a feed forward readout layer that is one of recurrent neural networks has been proposed (see Non-Patent Literature 4).

CITATION LIST

[Non Patent Literature 1]
"Reservoir computing approaches for representation and classification of multivariate time series," Filippo Maria Bianchia, Simone Scardapaneb, Sigurd L ksea, and Rovert Jenssen, arXiv:1803. 07870v2 [cs.NE] 6 Nov. 2018.
[Non Patent Literature 2]
"Merging Echo State and Feedforward Neural Networks for Time Series Forecasting," Stefan Babinec, and Jiri Pospichal, International Conference on Artificial Neural Networks ICANN 2006: Artificial Neural Networks— ICANN 2006 pp 367-375.
[Non Patent Literature 3]
"Real-Time Computing Without Stable States: A New Framework for Neural Computation Based on Perturbations," Wolfgang Maass, Thomas Natschlager, and Henry Markram.
[Non Patent Literature 4]
"Encoding Multi-Dimensional Time Series Data with Reservoir Computing," Yuichi Katori, 2016 International Symposium on Nonlinear Theory and Its Applications, NOLTA2016, Yugawara, Japan, Nov. 27-30, 2016.
[Non Patent Literature 5]
"An extension of the H_infinity learning to deep neural networks," IEICE Technical Report, IEICE-NC2019-92, IEICE-119(453) pp 95-100 Feb. 26, 2020 (in Japanese).

SUMMARY OF INVENTION

Technical Problem

Here, in a method described in Patent Literature 4, when a weight assigned to an edge connecting nodes (neurons) in a neural network is updated, an inverse matrix operation is performed. For this reason, in this method, the calculation cost increases, and it may be difficult to perform online learning (in a sense in the field of machine learning) of time series data.

Solution to Problem

The present invention provides a mean of online learning for the specific recurrent neural networks described in the above. One aspect of the present invention is a machine learning device performing online learning of input data of one or more dimensions aligned in a pre-determined order using a recurrent neural network having a plurality of nodes connected by edges to which weights are assigned, wherein the recurrent neural network has: an input layer having one or more input nodes; a 1st intermediate layer having one or more 1st intermediate nodes; a 2nd intermediate layer having one or more 2nd intermediate nodes; and an output layer having one or more output nodes, wherein the input nodes, the 1st intermediate nodes, the 2nd intermediate nodes, and the output nodes are nodes that are different from each other among the plurality of nodes, wherein the weights assigned to the edges connecting the 1st intermediate nodes are fixed to pre-determined intensity, wherein the machine learning device performs an output data generating process and a weight updating process every time the input layer receives the input data of one or more dimensions in the pre-determined order, wherein the output data generating process is a process in which: a 1st process of outputting the input data of the one or more dimensions received by the input layer from the input layer to the 1st intermediate layer, a 2nd process of outputting 1st intermediate data of one or more dimensions corresponding to the input data of the one or more dimensions input to the 1st intermediate layer in the 1st process, from the 1st intermediate layer to the 2nd intermediate layer, a 3rd process of outputting 2nd intermediate data of one or more dimensions corresponding to the 1st intermediate data of the one or more dimensions input to the 2nd intermediate layer in the 2nd process, from the 2nd intermediate layer to the output layer, and a 4th process of generating output data of one or more dimensions corresponding to the 2nd intermediate data of the one or more dimensions input to the output layer in the 3rd process are performed in an order of the 1st process, the 2nd process, the 3rd process, and the 4th process, and wherein the weight updating process is a process in which a weight assigned to each edge connecting the 1st intermediate node and the 2nd intermediate node and a weight assigned to each edge connecting the 2nd intermediate node and the output node are updated using an equation derived based on an extended Kalman filter method, the 1st intermediate data of the one or more dimensions, and the output data of the one or more dimensions.

Advantageous Effects of Invention

According to the present invention, online learning of input data of one or more dimensions aligned in a pre-determined order can be performed efficiently.

DESCRIPTION OF EMBODIMENTS

Embodiment

Hereinafter, an embodiment of the present invention will be described with reference to the drawings.
<Configuration of Machine Learning Device>

Figure 1:
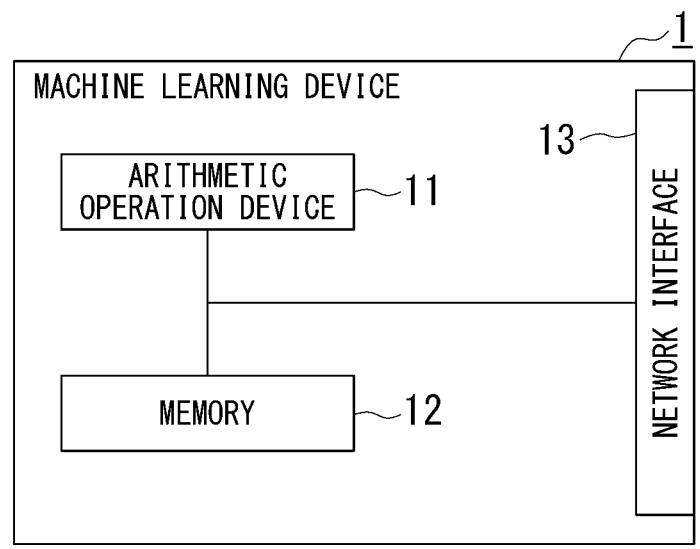
FIG. 1 is a diagram illustrating an example of the configuration of a machine learning device 1 according to an embodiment.

First, the configuration of the machine learning device 1 according to an embodiment will be described with reference to FIG. 1. FIG. 1 is a diagram illustrating an example of the configuration of the machine learning device 1 according to the embodiment.

The machine learning device 1 performs machine learning of P-dimensional input data. Here, P may be any integer as long as it is an integer equal to or greater than one. The machine learning device 1 performs such machine learning using a recurrent neural network having a plurality of nodes. In the recurrent neural network, the plurality of nodes are connected by edges to which weights are assigned.

Here, the P-dimensional input data is data having a mutual correlation. The P-dimensional input data is data that is aligned in a pre-determined order. Hereinafter, as one example, a case in which the pre-determined order is a time series order will be described. In this case, the P-dimensional input data is P-dimensional time series data. For example, the P-dimensional time series data is data that is acquired from P sensors in a time series order or the like. The P sensors may be P types of sensors, or a part thereof or all thereof may be P sensors of the same type. In addition, the pre-determined order may be another order such as a spatially-aligned order instead of the time series order.

Hereinafter, for the convenience of description, a time representing a time series order is denoted by a discrete time t. For example, t is an integer but is not limited thereto and may be another number such as a real number. Hereinafter, for the convenience of description, in a case in which certain data D1 is associated with a time t, the data D1 associated with the time t will be referred to as data D1 of the time t in description. In addition, other data D2 calculated based on the data D1 of the time t will be referred to as data D2 of the time t. In other words, the data D2 is data that is associated with the time t. The data D1 and the data D2 described as examples here represent certain data among data described below.

Figure 2:
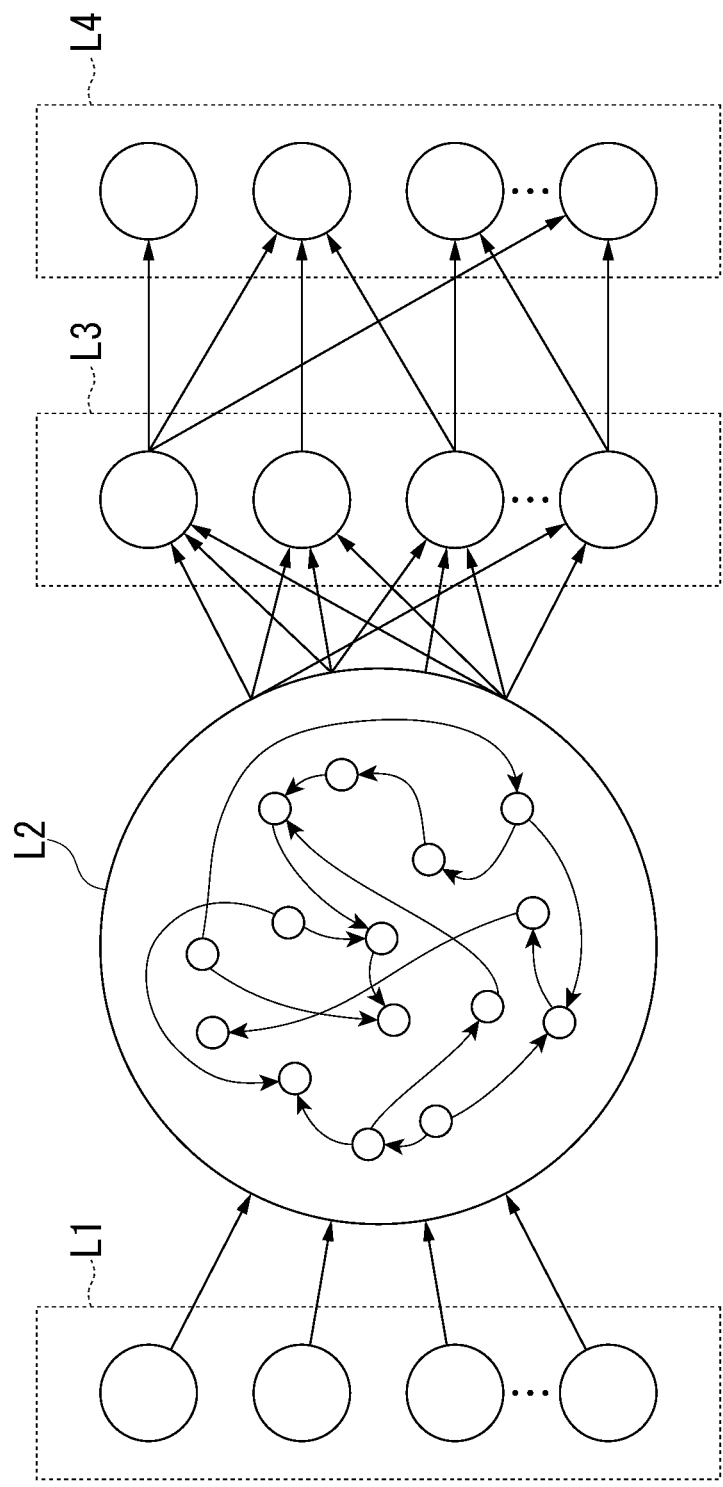
FIG. 2 is a diagram illustrating an example of the configuration of a recurrent neural network according to an embodiment.

Here, as illustrated in FIG. 2, the recurrent neural network according to the embodiment at least includes an input layer L1, a 1st intermediate layer L2, a 2nd intermediate layer L3, and an output layer L4. FIG. 2 is a diagram illustrating an example of the configuration of the recurrent neural network according to the embodiment. Hereinafter, for the convenience of description, the recurrent neural network according to the embodiment will be referred to as a Deep FORCE learning unit.

In a certain neural network, each node represents an arithmetic operation between pieces of data flowing in the neural network. For this reason, each node represents a function for executing the arithmetic operation in the neural network realized by software. In addition, each node represents an element executing the arithmetic operation in the neural network realized by hardware.

In a certain neural network, an edge that connects a certain node N1 and another node N2 represents a flow of data from the node N1 to the node N2. The data flowing from the node N1 to the node N2 is multiplied by a weight assigned to the edge connecting the node N1 and the node N2. In other words, data after being multiplied by the weight in accordance with passing through the edge is input to the node N2 from the edge. For this reason, in the neural network realized by software, the edge represents a function for multiplication with such a weight. In addition, in the neural network realized by hardware, the edge represents an element performing multiplication with such a weight.

The input layer L1 has input nodes. Here, the input layer L1 may have input nodes of the same number as the number of dimensions of P-dimensional input data or may have input nodes of a number different from the number of dimensions of P-dimensional input data. In addition, in a case in which the input layer L1 has input nodes of a number different from the number of dimensions of P-dimensional input data, the number of such input nodes may be smaller than P or may be larger than P. In such a case, for example, a weight-attached linear sum of P-dimensional input data is input to such input nodes. Hereinafter, as an example, a case in which the input layer L1 has P input nodes will be described. In this case, a certain input node receives input data associated with the input node among input data. In other words, a p-th input node among the P input nodes receives p-th input data in P-dimensional time series data. Here, p is one integer among integers equal to or larger than 1 and equal to or smaller than P. In other words, p is a number (label) that can be used for identifying each of the P input nodes. The input layer L1 outputs P-dimensional input data received by the P input nodes to the 1st intermediate layer L2.

The 1st intermediate layer L2 has a plurality of 1st intermediate nodes. The 1st intermediate layer L2 receives P-dimensional input data output by the input layer L1. More specifically, the 1st intermediate layer L2 receives P-dimensional input data output by the input layer L1 using a part of or all of the plurality of 1st intermediate nodes. The 1st intermediate layer L2 outputs Q-dimensional 1st intermediate data corresponding to the received P-dimensional input data to the 2nd intermediate layer L3. Here, Q may be any integer as long as it is an integer equal to or larger than 1. For this reason, the 1st intermediate layer L2 has at least Q 1st intermediate nodes that output Q-dimensional 1st intermediate data to the 2nd intermediate layer L3. Here, a q-th 1st intermediate node among these Q 1st intermediate nodes outputs q-th 1st intermediate data among Q-dimensional 1st intermediate data to the 2nd intermediate layer L3. Here, q is one integer among integers equal to or larger than 1 and equal to or smaller than Q. In addition, q is a number (label) that can be used for identifying each of the Q 1st intermediate nodes and is also a number (label) that can be used for identifying each of Q-dimensional 1st intermediate data.

Here, in a case in which one or more input data have been received, a certain 1st intermediate node generates an output value that is acquired in a case in which a total sum of the one or more input data that have been received is input to a 1st activation function. The 1st activation function may be any function as long as it is a nonlinear function. Then, the 1st intermediate node outputs the generated output value to another node connected with the 1st intermediate node by an edge. In a case in which the 1st intermediate node is one of the Q 1st intermediate nodes described above, the generated output value is output to the 2nd intermediate layer L3 as 1st intermediate data. Each of the 1st intermediate nodes included in the 1st intermediate layer L2 generates such an output value. In addition, description of the other processes such as addition of a bias and the like among processes performed by the 1st intermediate node will be omitted.

For example, the 1st intermediate layer L2 is a reservoir layer in reservoir computing. For this reason, weights inside the 1st intermediate layer L2 are determined using random numbers in advance. Then, update of weights inside the 1st intermediate layer L2 is not performed. In other words, weights assigned to edges connecting 1st intermediate nodes are fixed to pre-determined intensity (namely, pre-determined intensity using random numbers). In addition, the 1st intermediate layer L2 may be another intermediate layer in which weights are not updated in the layer instead of the reservoir layer.

The 2nd intermediate layer L3 has R 2nd intermediate nodes. Here, R may be any integer as long as it is an integer that is equal to or larger than 1. The 2nd intermediate layer L3 receives Q-dimensional 1st intermediate data from the 1st intermediate layer L2 using these R 2nd intermediate nodes. The 2nd intermediate layer L3 outputs R-dimensional 2nd intermediate data corresponding to the received Q-dimensional 1st intermediate data to the output layer L4. In other words, r-th 2nd intermediate node among the R 2nd intermediate nodes outputs r-th 2nd intermediate data among the R-dimensional 2nd intermediate data to the output layer L4. Here, r is one integer among integers equal to or larger than 1 and equal to smaller than R. In addition, r is a number (label) that can be used for identifying each of the R 2nd intermediate nodes and is also a number (label) that can be used for identifying each of R-dimensional 2nd intermediate data.

Here, in a case in which one or more 1st intermediate data have been received, a certain 2nd intermediate node generates an output value that is acquired in a case in which a total sum of the one or more 1st intermediate data that have been received is input to a 2nd activation function. The 2nd activation function will be described below. Then, the 2nd intermediate node outputs the generated output value to another node connected with the 2nd intermediate node using an edge. In accordance with this, the 2nd intermediate node outputs the output value to the output layer L4 as 2nd intermediate data. Each of 2nd intermediate nodes included in the 2nd intermediate layer L3 generates such an output value. In addition, description of the other processes such as addition of a bias and the like among processes performed by the 2nd intermediate node will be omitted.

The 2nd intermediate layer L3 is an intermediate layer in a feed forward readout layer. In addition, the 2nd intermediate layer L3 may have a multi-layer configuration instead of the one-layer configuration as illustrated in FIG. 2. In such a case, in a Deep FORCE learning unit, a plurality of layers present between the 1st intermediate layer L2 and the output layer L4 will be collectively referred to as a 2nd intermediate layer L3. For example, the 2nd intermediate layer L3 may be composed of n layers including a 21st intermediate layer to a 2n-th intermediate layer. Here, n is an integer equal to or larger than 2. In this case, the 2nd intermediate layer L3 receives Q-dimensional 1st intermediate data using each of a plurality of nodes included in the 21st intermediate layer. In accordance with this, in this case, in the 2nd intermediate layer L3, data flows from the 21st intermediate layer to the 2n-th intermediate layer in accordance with a data flow similar to a data flow in a feed forward readout layer. Then, in this case, in the 2nd intermediate layer L3, R-dimensional 2nd intermediate data is output from the 2n-th intermediate layer to the output layer L4.

The output layer L4 has S output nodes. Here, S may be any integer as long as it is an integer equal to or larger than 1. The output layer L4 receives R-dimensional 2nd intermediate data from the 2nd intermediate layer L3 using these S output nodes. The output layer L4 generates and outputs S-dimensional output data corresponding to the received R-dimensional 2nd intermediate data. In other words, an s-th output node among the S output nodes generates s-th output data among S-dimensional output data. Here, s is one integer among integers equal to or larger than 1 and equal to or smaller than S. In addition, s is a number (label) that can be used for identifying each of the S output nodes and is also a number (label) that can be used for identifying each of the S-dimensional output data.

Here, in a case in which one or more 2nd intermediate data have been received, a certain output node generates an output value that is acquired in a case in which a total sum of the one or more 2nd intermediate data that have been received is input to a 3rd activation function. In accordance with this, the output node outputs the output value as output data. The 3rd activation function will be described below. Each of the output nodes included in the output layer L4 generates such an output value. In addition, description of the other processes such as addition of a bias output of an output value and the like among processes performed by the output node will be omitted.

In this way, the Deep FORCE learning unit, in this example, has the 1st intermediate layer L2 that is a reservoir layer and the 2nd intermediate layer L3 that is an intermediate layer in a feed forward readout layer. For this reason, in this example, the Deep FORCE learning unit is a recurrent neural network that includes a reservoir layer and a feed forward readout layer.

In addition, the input node, the 1st intermediate node, the 2nd intermediate node, and the output node are different nodes among a plurality of nodes included in the Deep FORCE learning unit and do not overlap with each other.

Here, in a case in which certain data D1 is output from a certain input node X11 to a certain 1st intermediate node X12, the data D1 is multiplied by a weight assigned to an edge connecting the input node X11 and the 1st intermediate node X12. Then, the data D1 after multiplication with the weight is input to the 1st intermediate node X12.

In addition, in a case in which certain data D2 is output from a certain 1st intermediate node X21 to another 1st intermediate node X22, the data D2 is multiplied by a weight assigned to an edge connecting the 1st intermediate node X21 and the 1st intermediate node X22. Then, the data D2 after multiplication with the weight is input to the 1st intermediate node X22.

Furthermore, in a case in which certain data D3 is output from a certain 1st intermediate node X31 to a certain 2nd intermediate node X32, the data D3 is multiplied by a weight assigned to an edge connecting the 1st intermediate node X31 and the 2nd intermediate node X32. Then, the data D3 after multiplication with the weight is input to the 2nd intermediate node X32.

In addition, in a case in which certain data D4 is output from a certain 2nd intermediate node X41 to a certain output node X42, the data D4 is multiplied by a weight assigned to an edge connecting the 2nd intermediate node X41 and the output node X42. Then, the data D4 after multiplication with the weight is input to the output node X42.

Since weights inside the 1st intermediate layer L2 are not updated, update of weights is performed for a weight assigned to an edge connecting the 1st intermediate node and the 2nd intermediate node and a weight assigned to an edge connecting the 2nd intermediate node and the output node in the Deep FORCE learning unit. In addition, update of weights is not performed for a weight assigned to an edge connecting the input node and the 1st intermediate node. Thus, hereinafter, for the convenience of description, such weights for which update of weights is performed will be collectively referred to as update target weights unless there is a need to identify each of the weights.

In addition, "o" illustrated in FIG. 2 represents a node. In other words, "o" included in the input layer L1 represents an input node. In addition, "o" included in the 1st intermediate layer L2 represents a 1st intermediate node. Furthermore, "o" included in the 2nd intermediate layer L3 represents a 2nd intermediate node. In addition, "o" included in the output layer L4 represents an output node.

Each arrow connecting nodes illustrated in FIG. 2 is drawn for representing an image of a connection mode using an edge between nodes in the Deep FORCE learning unit to be easily understood and is different from a connection mode using an edge between nodes in an actual Deep FORCE learning unit.

In addition, input of input data to the input layer L1 and output of output data from the output layer L4 may be performed using a known method or may be performed using a method developed from now, and thus description thereof will be omitted.

The machine learning device 1 performs machine learning of the P-dimensional input data described above using such a Deep FORCE learning unit. More specifically, every time the input layer L1 receives P-dimensional input data in the order of the time series (in other words, every time the input layer L1 receives the input data in a pre-determined order), the machine learning device 1 performs an output data generating process and a weight updating process.

The output data generating process is a process for performing a 1st process, a 2nd process, a 3rd process, and a 4th process in an order of the 1st process, the 2nd process, the 3rd process, and the 4th process.

The 1st process is a process in which P-dimensional input data received by the input layer L1 is output from the input layer L1 to the 1st intermediate layer L2.

The 2nd process is a process in which Q-dimensional 1st intermediate data corresponding to the P-dimensional input data input to the 1st intermediate layer L2 by the 1st process is output from the 1st intermediate layer L2 to the 2nd intermediate layer L3.

The 3rd process is a process in which R-dimensional 2nd intermediate data corresponding to the Q-dimensional 1st intermediate data input to the 2nd intermediate layer L3 by the 2nd process is output from the 2nd intermediate layer L3 to the output layer L4. In addition, in a case in which the 2nd intermediate layer L3 is composed of n layers including the 21st intermediate layer to the 2n-th intermediate layer as described above, the 3rd process is a process in which R-dimensional 2nd intermediate data corresponding to the Q-dimensional 1st intermediate data input to the 21st intermediate layer of the 2nd intermediate layer L3 by the 2nd process is output from the 2n-th intermediate layer of the 2nd intermediate layer L3 to the output layer L4.

The 4th process is a process in which S-dimensional output data corresponding to the R-dimensional 2nd intermediate data input to the output layer L4 by the 3rd process is generated.

The output data generating process is a process that is similar to a process of generating output data in a general feed forward readout layer. For this reason, further description of the output data generating process will be omitted.

The weight updating process is a process of updating update target weights described above (in other words, a weight assigned to each edge connecting the 1st intermediate node and the 2nd intermediate node and a weight assigned to each edge connecting the 2nd intermediate node and the output node) using the Q-dimensional 1st intermediate data, the S-dimensional output data, and an equation derived based on an extended Kalman filter method.

Hereinafter, details of the weight updating process will be described in detail together with the configuration of the machine learning device 1.

Description will be presented by referring back to FIG. 1. The machine learning device 1 includes an arithmetic operation device 11, a memory 12, and a network interface 13. In addition, the machine learning device 1 may be configured to include other circuits and other devices in addition to these. For example, the machine learning device 1 may be configured to include input devices such as a keyboard and a mouse. In addition, for example, the machine learning device 1 may be configured to include an output device such as a display. Furthermore, for example, the machine learning device 1 may be configured to include an interface for a connection with at least one of the input device and the output device.

The arithmetic operation device 11 is a processor and, for example, is a field programmable gate array (FPGA). In addition, the arithmetic operation device 11 may be a central processing unit (CPU) instead of the FPGA, a combination of an FPGA and a CPU, or any other processor.

In this example, the arithmetic operation device 11 is an FPGA. For this reason, the arithmetic operation device 11 realizes a Deep FORCE learning unit using hardware (for example, an integrated circuit or the like) included in the FPGA and performs machine learning of p-dimensional input data. In addition, in a case in which the arithmetic operation device 11 is a CPU, the arithmetic operation device 11 may be configured to perform machine learning using a combination of hardware included in the CPU and software executed by the CPU. As will be described below, the arithmetic operation device 11 may be configured using a near memory, a memory logic, or the like. In other words, the arithmetic operation device 11 may be configured using hardware including at least one of a near memory and a memory logic.

For example, the memory 12 stores various kinds of information that is used by the arithmetic operation device 11. For example, the memory 12 includes a solid state drive (SSD), a hard disk drive (HDD), an electrically erasable programmable read-only memory (EEPROM), a read-only memory (ROM), a random access memory (RAM), and the like. In addition, the memory 12 may be a storage device of an externally-attaching type connected to a digital input/output port or the like of a USB or the like instead of being built into the arithmetic operation device 11.

The network interface 13 is an interface that is connected to an external device such as a sensor or the like through a network.

<Weight Updating Process>

Hereinafter, the weight updating process performed by the machine learning device 1 will be described. Here, the weight updating process described below is a process based on an extended Kalman filter method. In the weight updating process based on the extended Kalman filter method, sequential calculation corresponding to the order of a time series represented by discrete time t is performed. For this reason, a time t represented as an argument of a function, a vector, a matrix, and the like described below represents the order of the time series in such sequential calculation. The following formulation according to the extended Kalman filter method is merely an example, and other formulation may be used.

In the Deep FORCE learning unit, weights updated in the weight updating process are the update target weights described above. For this reason, in an embodiment, the 1st intermediate layer L2 inside which no weight is updated will be virtually considered as a part of the input layer L1. In such a consideration, the 1st intermediate data described above can be handled as a substitution for input data. Thus, a Q-dimensional vector having Q-dimensional 1st intermediate data as its component can be represented as in the following Equation (1).

[Math. 1]

$$y^I(t) = (y_1^I(t), \ldots, y_q^I(t), \ldots, y_Q^I(t))^T \tag{1}$$

Each component of the vector $y^I$ represented in Equation (1) described above represents Q-dimensional 1st intermediate data. In Equation (1), as described above, t is a time that represents the order of a time series in sequential calculation. In other words, $y^I(t)$ represents Q-dimensional 1st intermediate data output by the 1st intermediate layer L2 in accordance with input data of the time t (in other words, the 1 st intermediate data of the time t). In addition, the Q-dimensional 1st intermediate data output by the 1st intermediate layer L2 in accordance with the input data of the time t is Q-dimensional 1st intermediate data output by the 1st intermediate layer L2 in a case in which the input data of the time t has been received by the input layer L1. For this reason, $y^I(t)$ does not represent the 1st intermediate data that is calculated at the time t.

S-dimensional output data generated by the output layer L4 in accordance with the input data of the time t can be represented as in the following Equation (2). S-dimensional output data output by the output layer L4 in accordance with the input data of the time t is S-dimensional output data generated by the output layer L4 in a case in which the input data of the time t has been received by the input layer L1.

[Math. 2]

$$y^O(t) = (y_1^O(t), \ldots, y_s^O(t), \ldots, y_S^O(t))^T \tag{2}$$

Each component of a vector $y^O$ represented by Equation (2) described above is S-dimensional output data. In other words, $y^O(t)$ represents S-dimensional output data generated by the output layer L4 immediately after the input data of the time t has been received by the input layer L1 (in other words, output data of the time t). For this reason, $y^O(t)$ does not represent output data that is calculated at the time t.

R-dimensional 2nd intermediate data output by the 2nd intermediate layer L3 in accordance with the input data of the time t can be represented as in the following Equation (3). In addition, the R-dimensional 2nd intermediate data output by the 2nd intermediate layer L3 in accordance with the input data of the time t is R-dimensional 2nd intermediate data output by the 2nd intermediate layer L3 in a case in which the input data of the time t has been received by the input layer L1.

[Math. 3]

$$y^H(t) = (y_1^H(t), \ldots, y_r^H(t), \ldots, y_R^H(t))^T \tag{3}$$

Each component of a vector $y^H$ represented by Equation (3) described above represents R-dimensional 2nd intermediate data. In other words, $y^H(t)$ represents R-dimensional 2nd intermediate data output by the 2nd intermediate layer L3 in accordance with the input data of the time t (in other words, the 2nd intermediate data of the time t). For this reason, $y^H(t)$ does not represent the 2nd intermediate data that is calculated at the time t.

In addition, a weight assigned to an edge connecting a q-th 1st intermediate node among Q 1st intermediate nodes outputting 1st intermediate data and an r-th 2nd intermediate node among R 2nd intermediate nodes in a case in which input data of the time t has been received by the input layer L1 can be represented as in the following Equation (4).

[Math. 4]

$$w^{HI}(t) = (w_{11}^{HI}(t), \ldots, w_{rq}^{HI}(t), \ldots, w_{RQ}^{HI}(t))^T \tag{4}$$

Each component of a vector $w^{HI}$ represented by Equation (4) described above represents a weight assigned to an edge connecting a q-th 1st intermediate node among the Q 1st intermediate nodes outputting 1st intermediate data and an r-th 2nd intermediate node among the R 2nd intermediate nodes. In other words, each component of $w^{HI}(t)$ represents the weight according to input data of the time t (in other words, the weight of the time t).

In addition, a weight assigned to an edge connecting an r-th 2nd intermediate node among the R 2nd intermediate nodes outputting the 2nd intermediate data and an s-th output node among S output nodes in a case in which input data of the time t has been received by the input layer L1 can be represented as in the following Equation (5).

[Math. 5]

$$w^{OH}(t) = (w_{11}^{OH}(t), \ldots, w_{sr}^{OH}(t), \ldots, w_{SR}^{OH}(t))^T \tag{5}$$

Each component of a vector $w^{OH}$ represented by Equation (5) described above represents a weight assigned to an edge connecting an r-th 2nd intermediate node among the R 2nd intermediate nodes outputting 2nd intermediate data and an s-th output node among S output nodes. In other words, each component of $w^{OH}(t)$ represents the weight according to input data of the time t (in other words, the weight of the time t).

In addition, teacher data of a time t in the Deep FORCE learning unit can be represented as in the following Equation (6).

[Math. 6]

$$d(t)=(d_1(t),\ldots,d_s(t),\ldots,d_S(t))^T \quad (6)$$

Each component of a vector d(t) represented by Equation (6) described above represents teacher data corresponding to each of S-dimensional output data of the time t.

Here, s-th output data among S-dimensional output data represented by Equation (2) described above can be represented as in the following Equation (7) and Equation (8) based on Equation (3) and Equation (5).

[Math. 7]

$$y_s^O(t) = f^O(act_s(t)), s = 1, \ldots, S \quad (7)$$

[Math. 8]

$$act_s(t) = \sum_r w_{sr}^{OH}(t) y_r^H(t) \quad (8)$$

On the other hand, r-th 2nd intermediate data among R-dimensional 2nd intermediate data represented by Equation (3) described above can be represented as in the following Equation (9) and Equation (10) based on Equation (1) and Equation (4).

[Math. 9]

$$y_r^H(t) = f^H(act_r(t)), r = 1, \ldots, R \quad (9)$$

[Math. 10]

$$act_r(t) = \sum_q w_{rq}^{HI}(t) y_q^I(t) \quad (10)$$

A function $f^O$ in Equation (7) is the 3rd activation function described above. A function $f^H$ in Equation (9) is the 2nd activation function described above. Here, in the Deep FORCE learning unit, each of the 2nd activation function and the 3rd activation function is a function that satisfies a predetermined condition. The predetermined condition is being an odd function (a nonlinear function having symmetry with respect to 180° rotation around the origin as its center). For example, a function satisfying such the predetermined condition is a hyperbolic tangent function. Any one or both of the 2nd activation function and the 3rd activation function may be another nonlinear function that satisfies the predetermined condition instead of the hyperbolic tangent function.

Here, a Deep FORCE learning unit can be represented using nonlinear vector functions represented in the following Equation (11) and Equation (12).

[Math. 11]

$$\theta(t+1)=\theta(t)+\eta(t) \quad (11)$$

[Math. 12]

$$\theta(t)=(w^{HI}(t),w^{OH}(t))T \quad (12)$$

A vector θ(t) represented in Equation (11) described above is a vector that is calculated using Equation (12) and, as represented in Equation (12), is a weight vector having update target weights as its components. A vector η(t) in Equation (11) described above represents a modeling error for the vector θ(t). In other words, the vector η(t) is derived using an algorithm for representing a Deep FORCE learning unit using a certain nonlinear function.

In a case in which an extended Kalman filter method is employed as such an algorithm, Equation (11) described above can be rearranged to be represented as in the following Equation (13) to Equation (15) by setting a first term of a right side of Equation (11) as an estimated weight vector and setting a left side of Equation (11) as a predicted weight vector. The estimated weight vector is an estimated value of the weight vector described above in the extended Kalman filter method. In addition, the predicted weight vector is a predicted value of the weight vector in the extended Kalman filter method.

[Math. 13]

$$\hat{\theta}(t+1)=\overline{\theta}(t)+K(t)e(t) \quad (13)$$

[Math. 14]

$$\overline{\theta}(t)=\hat{\theta}(t)+\eta(t) \quad (14)$$

[Math. 15]

$$e(t)=y^O(t)-d(t) \quad (15)$$

In Equation (13) described above, "^" attached above a vector θ represents that the "^"-attached vector θ is an estimated weight vector. In addition, "—" attached above the vector θ in Equation (13) represents that an "—"-attached vector θ is a predicted weight vector. A vector e(t) in Equation (13), as represented in Equation (15), represents a difference between output data of a time t and teacher data of the time t. A matrix K in Equation (13) represents a Kalman gain matrix in the extended Kalman filter method. In other words, the matrix K(t) represents a Kalman gain matrix at a time t. A matrix K(t) is a matrix having (Q×R+S×R) rows and S columns. The reason for this is that the estimated weight vector represented on the left side of Equation (13) is a (Q×R+S×R)-dimensional vector, and the vector e(t) is an S-dimensional vector. Here, the matrix K(t) at a time t can be represented as in the following Equations (16) to (19).

[Math. 16]

$$K(t) = \overline{U}(t)H(t)A(t) \quad (16)$$

[Math. 17]

$$A(t) = \left(W(t) + H^T(t)\overline{U}(t)H(t)\right)^{-1} \quad (17)$$

[Math. 18]

$$\overline{U}(t) = \hat{U}(t-1) + V(t) \quad (18)$$

[Math. 19]

$$\hat{U}(t) = K(t)H^T(t)\overline{U}(t) + \overline{U}(t) \quad (19)$$

[Math. 20]

$$H(t) = \frac{\partial y^O(t)}{\partial \theta}\bigg|_{\theta=\hat{\theta}(t-1)} = \left[\frac{\partial y^O(t)}{\partial w^{HI}}, \frac{\partial y^O(t)}{\partial w^{OH}}\right]_{\theta=\hat{\theta}(t-1)} \quad (20)$$

In Equation (16) described above, "—" attached above the matrix U(t) represents that the "—"-attached matrix U(t) is a predicted value of a covariance matrix in the extended Kalman filter method. In addition, a matrix A(t) in Equation (16) represents a scaling factor of a time t. This matrix A(t) is calculated using Equation (17). In addition, a matrix W(t) in Equation (17) represents a covariance matrix of modeling error of a time t. A matrix V(t) in Equation (18) is a matrix having a component corresponding to an error distribution given in advance and represents error of a "^"-attached matrix U(t−1). The "^"-attached matrix U(t−1) represents an estimated value of a covariance matrix in the extended Kalman filter method. The "^"-attached matrix U(t) is calculated using Equation (19). In other words, the "^"-attached matrix U(t) is calculated through sequential calculation using Equation (18) and Equation (19). A matrix H(t) in Equation (16) represents a Jacobian in the extended Kalman filter method. The matrix H(t) is calculated using Equation (20). The matrix H(t), in other words, the Jacobian corresponds to an observation matrix in control engineering.

The machine learning device 1 updates update target weights by performing sequential calculation using Equations (13) to (20) described above. In order to update the update target weights through this sequential calculation, the Jacobian represented in Equation (20) needs to be specifically calculated. As represented in the right side of Equation (20), the Jacobian is represented using two block matrixes. Each component of these two block matrixes is represented using the following Equation (21) and Equation (22).

[Math. 21]

$$\frac{\partial y^O(t)}{\partial w^{HI}} = \begin{pmatrix} \frac{\partial y_1^O(t)}{\partial w_{11}^{HI}} & \cdots & \frac{\partial y_1^O(t)}{\partial w_{rq}^{HI}} & \cdots & \frac{\partial y_1^O(t)}{\partial w_{RQ}^{HI}} \\ \vdots & & \vdots & & \vdots \\ \frac{\partial y_s^O(t)}{\partial w_{11}^{HI}} & \cdots & \frac{\partial y_s^O(t)}{\partial w_{rq}^{HI}} & \cdots & \frac{\partial y_s^O(t)}{\partial w_{RQ}^{HI}} \\ \vdots & & \vdots & & \vdots \\ \frac{\partial y_S^O(t)}{\partial w_{11}^{HI}} & \cdots & \frac{\partial y_S^O(t)}{\partial w_{rq}^{HI}} & \cdots & \frac{\partial y_S^O(t)}{\partial w_{RQ}^{HI}} \end{pmatrix} \quad (21)$$

[Math. 22]

$$\frac{\partial y^O(t)}{\partial w^{OH}} = \begin{pmatrix} \frac{\partial y_1^O(t)}{\partial w_{11}^{OH}} & \cdots & \frac{\partial y_1^O(t)}{\partial w_{sr}^{OH}} & \cdots & \frac{\partial y_1^O(t)}{\partial w_{SR}^{OH}} \\ \vdots & & \vdots & & \vdots \\ \frac{\partial y_s^O(t)}{\partial w_{11}^{OH}} & \cdots & \frac{\partial y_s^O(t)}{\partial w_{sr}^{OH}} & \cdots & \frac{\partial y_s^O(t)}{\partial w_{SR}^{OH}} \\ \vdots & & \vdots & & \vdots \\ \frac{\partial y_S^O(t)}{\partial w_{11}^{OH}} & \cdots & \frac{\partial y_S^O(t)}{\partial w_{ST}^{OH}} & \cdots & \frac{\partial y_S^O(t)}{\partial w_{SR}^{OH}} \end{pmatrix} \quad (22)$$

Each component of the block matrix represented in Equation (21) described above can be expanded as in the following Equation (23) using Equations (7) to (10) described above.

[Math. 23]

$$\begin{aligned}\frac{\partial y_s^O(t)}{\partial w_{rq}^{HI}} &= \frac{\partial y_s^O(t)}{\partial act_s(t)} \frac{\partial act_s(t)}{\partial w_{rq}^{HI}} \\ &= f^{O'}(act_s(t))\frac{\partial}{\partial w_{rq}^{HI}}\left(\sum_s w_{sr}^{OH} y_r^H(t)\right) \\ &= f^{O'}(act_s(t))w_{sr}^{OH}\frac{\partial y_r^H(t)}{\partial w_{rq}^{HI}} \\ &= f^{O'}(act_s(t))w_{sr}^{OH}\frac{\partial y_r^H(t)}{\partial act_r(t)}\frac{\partial act_r(t)}{\partial w_{rq}^{HI}} \\ &= f^{O'}(act_s(t))w_{sr}^{OH} f^{H'}(act_r(t))\frac{\partial}{\partial w_{rq}^{HI}}\left(\sum_q w_{rq}^{HI} y_q^I(t)\right) \\ &= f^{O'}(act_s(t))w_{sr}^{OH} f^{H'}(act_r(t))y_q^I(t)\end{aligned} \quad (23)$$

In a case in which combination destinations of nodes do not coincide with each other, in other words, in the case of q≠r, Equation (23) described above becomes 0.

Each component of the block matrix represented in Equation (22) described above can be expanded as in the following Equation (24) using Equations (7) to (10) described above.

[Math. 24]

$$\begin{aligned}\frac{\partial y_s^{O(t)}}{\partial w_{sr}^{OH}} &= \frac{\partial y_s^O(t)}{\partial act_s(t)}\frac{\partial act_s(t)}{\partial w_{sr}^{OH}} \\ &= f^{O'}(act_s(t))\frac{\partial}{\partial w_{sr}^{OH}}\left(\sum_r w_{sr}^{OH} y_r^H(t)\right) \\ &= f^{O'}(act_s(t))y_r^H(t)\end{aligned} \quad (24)$$

In this way, each component of the two block matrixes represented in the right side of Equation (20) described above can be calculated based on Equation (23) and Equation (24) described above. As a result, since the Jacobian described above can be calculated, by giving initial values to the "^"-attached matrix U(t), the matrix V(t), and the matrix W(t) described above, the machine learning device 1 can calculate the matrix K(t) that is a Kalman gain matrix. In accordance with this, the machine learning device 1 can update the update target weights based on Equation (13) to Equation (15) described above.

Figure 3:
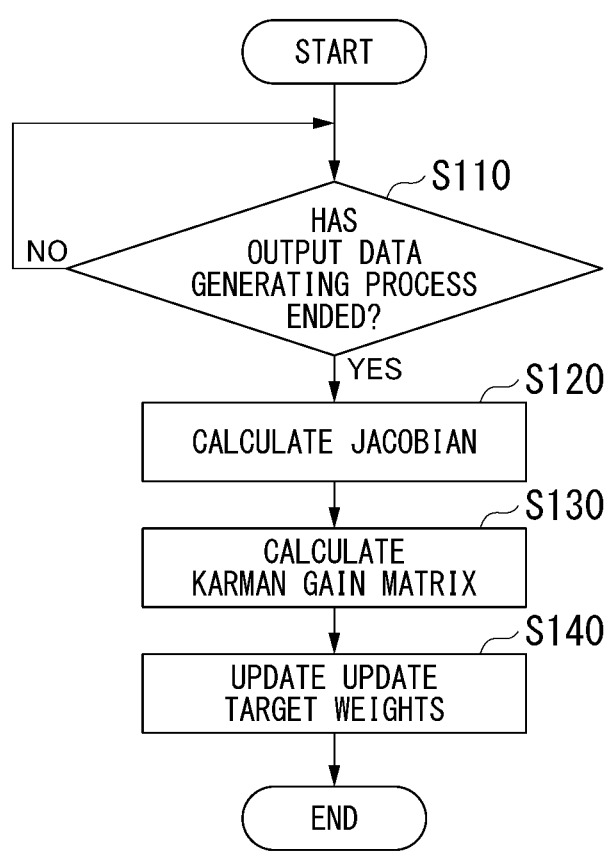
FIG. 3 is a diagram illustrating an example of the flow of a weight updating process performed by the machine learning device 1.

Here, the flow of the weight updating process performed by the machine learning device 1 will be described with reference to FIG. 3. FIG. 3 is a diagram illustrating an example of the flow of the weight updating process performed by the machine learning device 1. Every time the input layer L1 receives P-dimensional input data in the order of a time series, the machine learning device 1 performs the process of the flowchart illustrated in FIG. 3.

The machine learning device 1 waits until the output data generating process ends (Step S110).

In a case in which it is determined that the output data generating process ends (Step S110—Yes), the machine learning device 1 calculates the Jacobian described above based on Equations (7) to (10) and Equations (20) to (24) described above, the 2nd activation function, and the 3rd activation function (for example, both the functions are hyperbolic tangent functions) (Step S120). At this time, the machine learning device 1 calculates the Jacobian using the 1st intermediate data output from the 1st intermediate layer L2, the 2nd intermediate data output from the 2nd intermediate layer L3, the output data generated by the output layer L4, and the update target weights.

Next, the machine learning device 1 calculates the Kalman gain matrix described above based on Equations (16) to (19) and the Jacobian calculated in Step S120 (Step S130). The process of Step S130 is a calculation process for minimizing the "^"-attached matrix U represented in Equation (19) described above. Here, when the process of Step S130 is performed for the first time, the machine learning device 1 calculates a Kalman gain matrix using initial values given in advance by a user for each of the three matrixes including the "^"-attached matrix U(t), the matrix V(t), and the matrix W(t).

Here, the general case for calculating the Jacobian described above will be described.

The following Equation (25) is a more general case for calculating the Jacobian.

[Math. 25]

$$\frac{\partial z^L}{\partial w_{ij}^{L-4}} = \frac{\partial z^L}{\partial s^L}\left(\frac{\partial s^L}{\partial z^{L-1}}\frac{\partial z^{L-1}}{\partial s^{L-1}}\right)\left(\frac{\partial s^{L-1}}{\partial z^{L-2}}\frac{\partial z^{L-2}}{\partial s^{L-2}}\right)\left(\frac{\partial s^{L-2}}{\partial z^{L-3}}\frac{\partial z^{L-3}}{\partial s^{L-3}}\right)\frac{\partial s^{L-3}}{\partial w_{ij}^{L-4}} \quad (25)$$

$$\frac{\partial z^L}{\partial w_{kj}^{L-3}} = \frac{\partial z^L}{\partial s^L}\left(\frac{\partial s^L}{\partial z^{L-1}}\frac{\partial z^{L-1}}{\partial s^{L-1}}\right)\left(\frac{\partial s^{L-1}}{\partial z^{L-2}}\frac{\partial z^{L-2}}{\partial s^{L-2}}\right)\frac{\partial s^{L-2}}{\partial w_{kj}^{L-3}}$$

$$\frac{\partial z^L}{\partial w_{mk}^{L-2}} = \frac{\partial z^L}{\partial s^L}\left(\frac{\partial s^L}{\partial z^{L-1}}\frac{\partial z^{L-1}}{\partial s^{L-1}}\right)\frac{\partial s^{L-1}}{\partial w_{mk}^{L-2}}$$

$$\frac{\partial z^L}{\partial w_{nm}^{L-1}} = \frac{\partial z^L}{\partial s^L}\frac{\partial s^L}{\partial w_{nm}^{L-1}}$$

$$s^{L-1} = \frac{\partial s^L}{\partial w_{nm}^{L-1}}$$

Among the partial derivatives included in the above Equation (25), the three partial derivatives shown in following Equation (26) represent the weights in the layer indicated by the subscript L among the input layer L1, the first intermediate layer L2, the second intermediate layer L3, and the output layer L4, and are stored sequentially in the memory 12.

[Math. 26]

$$\frac{\partial s^L}{\partial z^{L-1}} \quad (26)$$

$$\frac{\partial s^{L-1}}{\partial z^{L-2}}$$

$$\frac{\partial s^{L-2}}{\partial z^{L-3}}$$

On the other hand, among the partial derivatives included in the above Equation (25), the four partial derivatives shown in the following Equation (27) are the partial derivatives for a parameter of a activation function in the layer indicated by the subscript L among the input layer L1, the first intermediate layer L2, the second intermediate layer L3, and the output layer L4, and are shown as a function of the parameter of the activation function in the layer denoted by the subscript L. The parameter shown in this way is obtained by sequential calculations and do not need to be kept in the memory 12 persistently.

[Math. 27]

$$\frac{\partial z^L}{\partial s^L} \quad (27)$$

$$\frac{\partial z^{L-1}}{\partial s^{L-1}}$$

$$\frac{\partial z^{L-2}}{\partial s^{L-2}}$$

$$\frac{\partial z^{L-3}}{\partial s^{L-3}}$$

The practical calculation using the above equation (25) is performed in the following order. First, the weights of the input layer L1 are read from memory 12, and by performing a product-sum operation with sequential data (state values of the reservoir layer), the parameter of the activation function in the input layer L1 is obtained. Next, the weights of the first intermediate layer L2 are read from memory 12, and the parameter of the activation function in the first intermediate layer L2 are calculated. Next, the weights of the second intermediate layer L3 are read from memory 12, and the parameter of the activation function in the second intermediate layer L3 are calculated. Finally, the weights of the output layer L4 are read from memory 12, and the parameter of the activation function in the output layer L4 are calculated. Simultaneously with these calculations, the Jacobian is calculated based on Equation (25) above.

The equation for calculating the Jacobian shown in Equation (25) above is a "differentiable" expression, which can be calculated recursively "backward" from a later step closer to the output to a previous step closer to the input (Non-Patent Document 5). In other words, in the Non-Patent Document 5, the Jacobian, which is required to find the Kalman gain, is calculated by a backward recursive update formula. The method saves the memory size to be retained. For this reason, the method is known to be useful for updating the weights of large neural networks over deep layers, such as in deep learning. On the other hand, the method recursively reads the memory of the array and repeatedly calculates the Jacobian between each layer, which decreases the computational throughput in exchange for memory-efficiency. Thus, the above method is suitable for performing large-scale learning using GPU (Graphics Processing Unit).

In contrast, in the method using the above Equation (25), once the parameter of the activation function in each layer is obtained, the retained weights are read from the memory 12, and the Jacobian is immediately calculated based on the read weights. If the Jacobian calculation is performed in a "forward" direction from the first step near the input to the second step near the output, memory access and the number of operations can be reduced, and the Jacobian can be obtained efficiently. In other words, the method using the above Equation (25) calculates the Jacobian by means of a newly formulated forward-looking recursive update formula. Therefore, the method using the above Equation (25) can improve the efficiency of memory access and achieve data flow operations with optimal throughput for the neural network configuration to be trained. To supplement, our customized extended Kalman filter is characterized by the observation that the Jacobian required when updating the weights is calculated using a forward looking update formula, which is represented as a computational graph in forward order. Moreover, in the case of differentiable activation functions, the partial derivatives of an activation function can be calculated using the analytical form, resulting in reducing numerical errors. Finally, our method can be regarded as a "differentiable" FORCE learning based on extended Kalman filter computed on the forward computational graph, which is more suitable for computation on an edge device.

Next, the machine learning device 1 updates the update target weights based on Equation (13) to Equation (15) described above, a vector η(t) that is modeling error, the matrix K(t) calculated in Step S130, teacher data, the output data generated by the output layer L4, and the update target weights (Step S140) and ends the process.

In accordance with the process of the flowchart as above, the machine learning device 1 performs the weight updating process. Here, in the process of the flowchart illustrated in FIG. 3, the machine learning device 1, as described above, does not perform an inverse matrix operation. In other words, in this process, the machine learning device 1 only performs sequential calculation using equations derived in advance through analysis calculation. For this reason, the machine learning device 1 can reduce the calculation cost of this process to be smaller than that of the process of performing an inverse matrix operation. In addition, in accordance with this process, the machine learning device 1 can perform online learning using the Deep FORCE learning unit illustrated in FIG. 2. As a result, for example, the machine learning device 1 can be mounted in an edge device as a device that performs machine learning using the Deep FORCE learning unit. In a case in which the Deep FORCE learning unit is considered to be mounted in an edge device or the like, the efficiency of the process becomes important. For this reason, in this process, it is required to realize an efficient data flow. Particularly, in a case in which a Deep FORCE learning unit is mounted in an edge device or the like as hardware including at least one of a near memory and a memory logic, realization of the efficient data flow leads to increases in a memory access speed, a calculation speed, and the like, thus it is very important. Thus, hereinafter, an efficient data flow in the process will be described.

<Data Flow in Weight Updating Process>

As described above, the Deep FORCE learning unit can be mounted in an edge device or the like as hardware including at least one of a near memory and a memory logic. A memory access speed, a calculation speed, and the like of the Deep FORCE learning unit mounted in an edge device or the like as this hardware differ in accordance with a design of the data flow in the weight updating process. From such reason, in a case in which the Deep FORCE learning unit is mounted in an edge device or the like as hardware including at least one of a near memory and a memory logic, an efficiency data flow needs to be considered.

Thus, hereinafter, a specific example considered to be efficient as the data flow in the weight updating process will be described.

Figure 4:
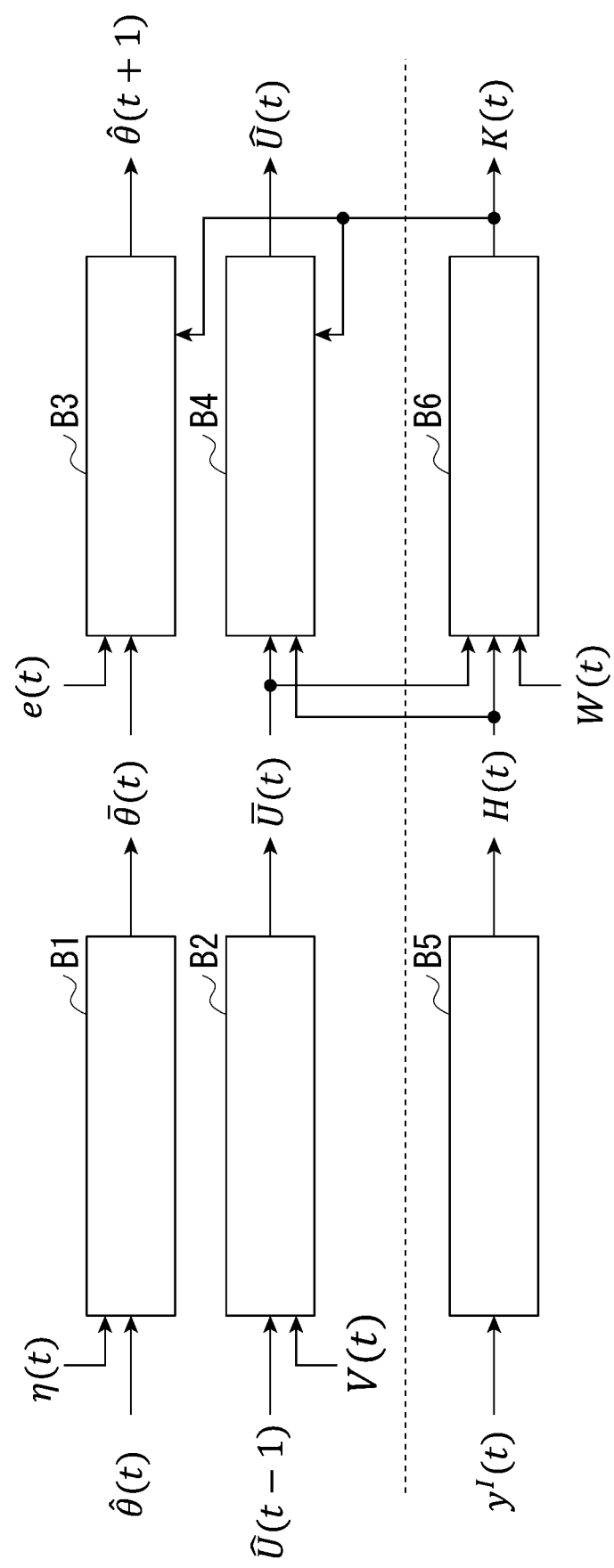
FIG. 4 is a diagram illustrating an example of the entire configuration of a data flow in the weight updating process.

FIG. 4 is a diagram illustrating an example of the entire configuration of the data flow in the weight updating process. When largely divided, the data flow in the weight updating process, as illustrated in FIG. 4, is composed of six blocks including blocks B1 to B6. Each of these six blocks represents hardware including at least one of a near memory and a memory logic. In FIG. 4, the order of a time series in the data flow is represented by a time t.

The block B1 is a block that calculates the predicted weight vector described above using a process based on Equation (14) described above. A vector η(t) and a "^"-attached vector θ(t) are input to the block B1. Then, the block B1 calculates a "—"-attached vector θ(t), in other words, a predicted weight vector. The block B1 outputs the calculated predicted weight vector to the block B2.

The block B2 is a block that calculates a predicted value of a covariance matrix in the extended Kalman filter method by performing a process based on Equation (18) described above. A "^"-attached matrix U(t−1) and a matrix V(t) are input to the block B2. Then, the block B2 calculates a predicted value of the covariance matrix, in other words, a "—"-attached matrix U(t). The block B2 outputs the calculated "—"-attached matrix U(t) to each of the block B4 and the block B6.

The block B3 is a block that updates an estimated weight vector by performing a process based on Equation (13) described above. A vector e(t), the "—"-attached vector θ(t) output from the block B1, and a matrix K(t) output from the block B6 to be described below are input to the block B3. Then, the block B3 calculates an estimated weight vector, in other words, a "^"-attached vector θ(t+1). The block B3 outputs the calculated "^"-attached vector θ(t+1).

The block B4 is a block that calculates an estimated value of the covariance matrix in the extended Kalman filter method by performing a process based on Equation (19) described above. The "—"-attached matrix U(t) output from the block B2, a matrix H(t) output from the block B5 to be described below, and a matrix K(t) output from the block B6 to be described below are input to the block B4. Then, the block B4 calculates the estimated value, in other words, a "^"-attached matrix U(t). The block B4 outputs the calculated "^"-attached matrix U(t).

The block B5 is a block that calculates a Jacobian by performing a process based on Equation (7) to Equation (10) described above. A vector $y^I(t)$ is input to the block B5. Then, the block B5 calculates a Jacobian, in other words, a matrix H(t). The block B5 outputs the calculated matrix H(t) to each of the block B4 and the block B6. In addition, the block B5 also performs the output data generating process described above. A data flow inside the block B5 will be described below.

The block B6 is a block that calculates a Kalman gain matrix by performing a process based on Equation (16) and Equation (17) described above. The "—"-attached matrix U(t) output from the block B2, the matrix H(t) output from the block B5, and a matrix W(t) are input to the block B6. Then, the block B6 calculates a Kalman gain matrix, in other words, a matrix K(t). The block B6 outputs the calculated matrix K(t). At this time, the block B6 also outputs the matrix K(t) to the block B3.

Figure 5:
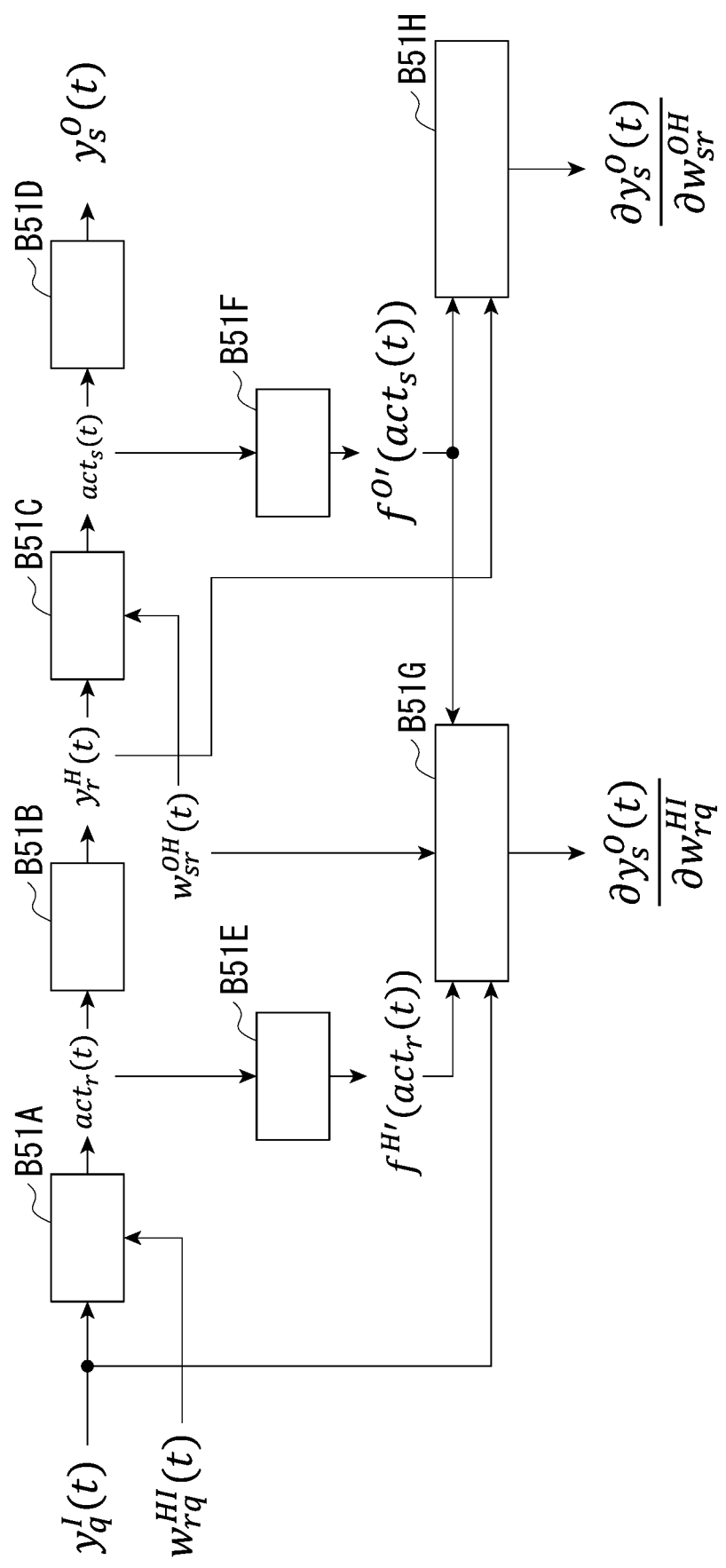
FIG. 5 is a diagram illustrating a simplest specific example of a data flow inside a block B5.

Here, FIG. 5 is a diagram illustrating a simplest specific example of a data flow inside the block B5. The data flow illustrated in FIG. 5 is a data flow that is formed for any functions when each of the 2nd activation function and the 3rd activation function employed in the Deep FORCE learning unit satisfies the predetermined condition described above. The data flow in the output data generating process described above is also included in the data flow illustrated in FIG. 5. When being largely divided, the data flow illustrated in FIG. 5 is composed of 8 blocks including a block B51A to a block B51H. Each of the 8 blocks represents hardware that includes at least one of a near memory and a memory logic. In FIG. 5, the order of a time series in the data flow is represented using a time t.

The block B51A is a block that performs calculation of Equation (10) described above. In other words, a vector $y^I(t)$ and a vector $w^{III}(t)$ are input to the block B51A. Then, the block B51A calculates $act_r(t)$ and outputs the calculated $act_r(t)$. More specifically, the block B51A outputs the calculated $act_r(t)$ to each of the block B51B and the block B51E.

The block B51B is a block that performs calculation of Equation (9) described above. In other words, $act_r(t)$ output from the block B51A is input to the block B51B. Then, the block B51B calculates a vector $y^H(t)$ and outputs the calculated vector $y^H(t)$. More specifically, the block B51B outputs the calculated vector $y^H(t)$ to each of the block B51C and the block B51H.

The block B51C is a block that performs calculation of Equation (8) described above. In other words, the vector $y^H(t)$ output from the block B51B and a vector $w^{OH}(t)$ are input to the block B51C. Then, the block B51C calculates $act_s(t)$ and outputs the calculated $act_s(t)$. More specifically, the block B51C outputs the calculated $act_s(t)$ to each of the block B51D and the block B51F.

The block B51D is a block that performs calculation of Equation (7) described above. In other words, the $act_s(t)$ output from the block B51C is input to the block B51D. Then, the block B51D calculates a vector $y^O(t)$ and outputs the calculated vector $y^O(t)$.

In this way, the data flow flowing in the order of the block B51A, the block B51B, the block B51C, and the block B51D is a data flow in the output data generating process.

The block B51E is a block that calculates $f^{H'}(act_r(t))$ in Equation (23) described above. In other words, $act_r(t)$ output from the block B51A is input to the block B51E. Then, the block B51E calculates $f^{H'}(act_r(t))$ and outputs the calculated $f^{H'}(act(t))$ to the block B51G.

The block B51F is a block that calculates $f^{O'}(act_s(t))$ in Equation (23) and Equation (24) described above. In other words, $act_s(t)$ output from the block B51C is input to the block B51F. Then, the block B51F calculates $f^{O'}(act_s(t))$ and outputs the calculated $f^{O'}(act_s(t))$. More specifically, the block B51F outputs the calculated $f^{O'}(act_s(t))$ to each of the block B51G and the block B51H.

The block B51G is a block that performs calculation of Equation (23) described above. In other words, a vector $y^I(t)$, a vector $w^{OH}(t)$, $f^{H'}(act_r(t))$ output from the block B51E, and $f^{O'}(act_s(t))$ output from the block B51F are input to the block B51G. Then, the block B51G calculates each component of the left side of Equation (23).

The block B51H is a block that performs calculation of Equation (24) described above. In other words, the vector $y^H(t)$ output from the block B51B and $f^{O'}(act_s(t))$ output from the block B51F are input to the block B51H. Then, the block B51G calculates each component of the left side of Equation (24).

Here, a value output from each of the block B51G and the block B51H is merely a Jacobian, in other words, each component of the matrix H(t).

In this way, in the data flow illustrated in FIG. 5, the process of calculating $act_r(t)$ and $act_s(t)$ is common in the output data generating process and the process of calculating a Jacobian. In other words, this data flow is a data flow in which an arithmetic operation process is common in a part of the output data generating process and a part of the weight updating process. The machine learning device 1 can mount a Deep FORCE learning unit in an edge device or the like as hardware including at least one of a near memory and a memory logic based on such a data flow. As a result, the machine learning device 1 can increase a memory access speed, a calculation speed, and the like without using a special function as each of the 2nd activation function and the 3rd activation function.

Figure 6:
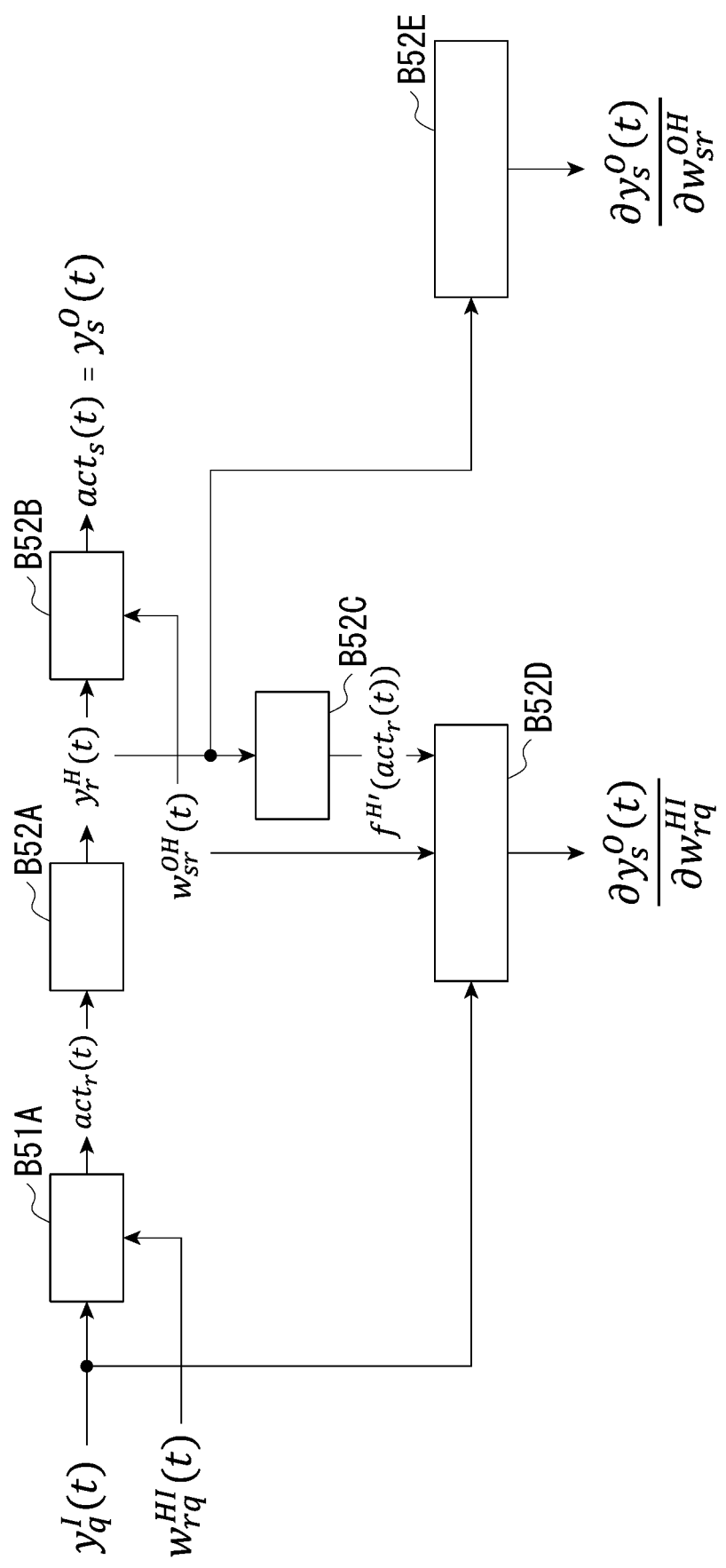
FIG. 6 is a diagram illustrating another specific example of the data flow inside the block B5.

FIG. 6 is a diagram illustrating another specific example of the data flow inside the block B5. The data flow illustrated in FIG. 6 is a data flow that is formed in a case in which the 2nd activation function $f^H$ is a hyperbolic tangent function, and the 3rd activation function $f^O$ is an identify function. The data flow in the output data generating process described above is also included in the data flow illustrated in FIG. 6. When being largely divided, the data flow illustrated in FIG. 6 is composed of 6 blocks including a block B51A and blocks B52A to B52E. Each of the 6 blocks represents hardware that includes at least one of a near memory and a memory logic. In FIG. 6, the order of a time series in the data flow is represented using a time t. In FIG. 6, a similar reference sign will be assigned to a block that has the same function as a block illustrated in FIG. 5 (in other words, the block B51A), and description thereof will be omitted. In FIG. 6, the block B51A outputs $act_r(t)$ to the block B52A.

The block B52A is a block that performs calculation of Equation (9) described above. The block B52A performs this calculation using a hyperbolic tangent function as the 2nd activation function. $act_r(t)$ output from the block B51A is input to the block B52A. Then, the block B52A calculates a vector $y^H(t)$ using a hyperbolic tangent function as the 2nd activation function and outputs the calculated vector $y^H(t)$. More specifically, the block B52A outputs the calculated vector $y^H(t)$ to each of the block B51C and the block B52C.

The block B52B is a block that performs calculation of Equation (8) described above. In other words, the vector $y^H(t)$ output from the block B51B and a vector $w^{OH}(t)$ are input to the block B52B. Then, the block B52B calculates $act_s(t)$. Here, in the example illustrated in FIG. 6, the 3rd activation function is an identify function. In other words, in FIG. 6, a block corresponding to the block B51D illustrated in FIG. 5 is unnecessary, and $act_s(t)$ calculated by the block B52B becomes a vector $y^O(t)$. In addition, differential of the identify function is 1. In other words, $f^{O'}(act_s(t))=1$. For this reason, in FIG. 6, a block corresponding to the block B51F illustrated in FIG. 5 is unnecessary.

The block B52C is a block that calculates $f^{H'}(act_r(t))$ in Equation (23) described above. In the example illustrated in FIG. 6, the 2nd activation function $f^H$ is a hyperbolic tangent function. In this case, as represented in the following Equation (28), $f^{H'}(act_r(t))$ can be newly written into square of the vector $y^H(t)$.

[Math. 28]

$$f^{H'}(act_r(t))=1-(y_r^H)^2 \qquad (28)$$

For this reason, the data flow illustrated in FIG. 6 may include a block B52C instead of the block B51E illustrated in FIG. 5. In addition, for example, the block B52C may be configured as a lookup table. This is one of advantages according to $f^{H'}(act_r(t))$ being able to be written into square of the vector $y^H(t)$. The vector $y^H(t)$ output from the block B52A is input to the block B52C. Then, the block B52C calculates (or specifies) $f^{H'}(act_r(t))$. The block B52C outputs the calculated $f^{H'}(act_r(t))$ to the block B52D.

The block B52D is a block that performs calculation of Equation (23) described above. In other words, a vector $y^I(t)$, a vector $w^{OH}(t)$, and $f^{H'}(act_r(t))$ output from the block B52C are input to the block B52D. Then, the block B52D calculates each component of the left side of Equation (23). The block B52D outputs the calculated each component. In the example illustrated in FIG. 6, as described above, the 3rd activation function $f^O$ is an identify function. For this example, $f^{O'}(act_s(t))$ used in the block B52D is constantly identical to 1.

The block B52E is a block that performs calculation of Equation (24) described above. In other words, the vector $y^H(t)$ output from the block B52A is input to the block B52E. Then, the block B52E calculates each component of the left side of Equation (24). In the example illustrated in FIG. 6, as described above, the 3rd activation function $f^O$ is a identify function. For this reason, $f^{O'}(act_s(t))$ that is used in the block B52E is constantly identical to 1.

In this way, in the data flow illustrated in FIG. 6, the number of blocks can be configured to be smaller than that of the data flow illustrated in FIG. 5. This means that, in a case in which a Deep FORCE learning unit is mounted in an edge device or the like as hardware including at least one of a near memory and a memory logic, the machine learning device 1 can be designed more simply based on the data flow illustrated in FIG. 6. As a result, in this case, the machine learning device 1 can reduce power consumption, and a memory access speed, a calculation speed, and the like can be increased.

Figure 7:
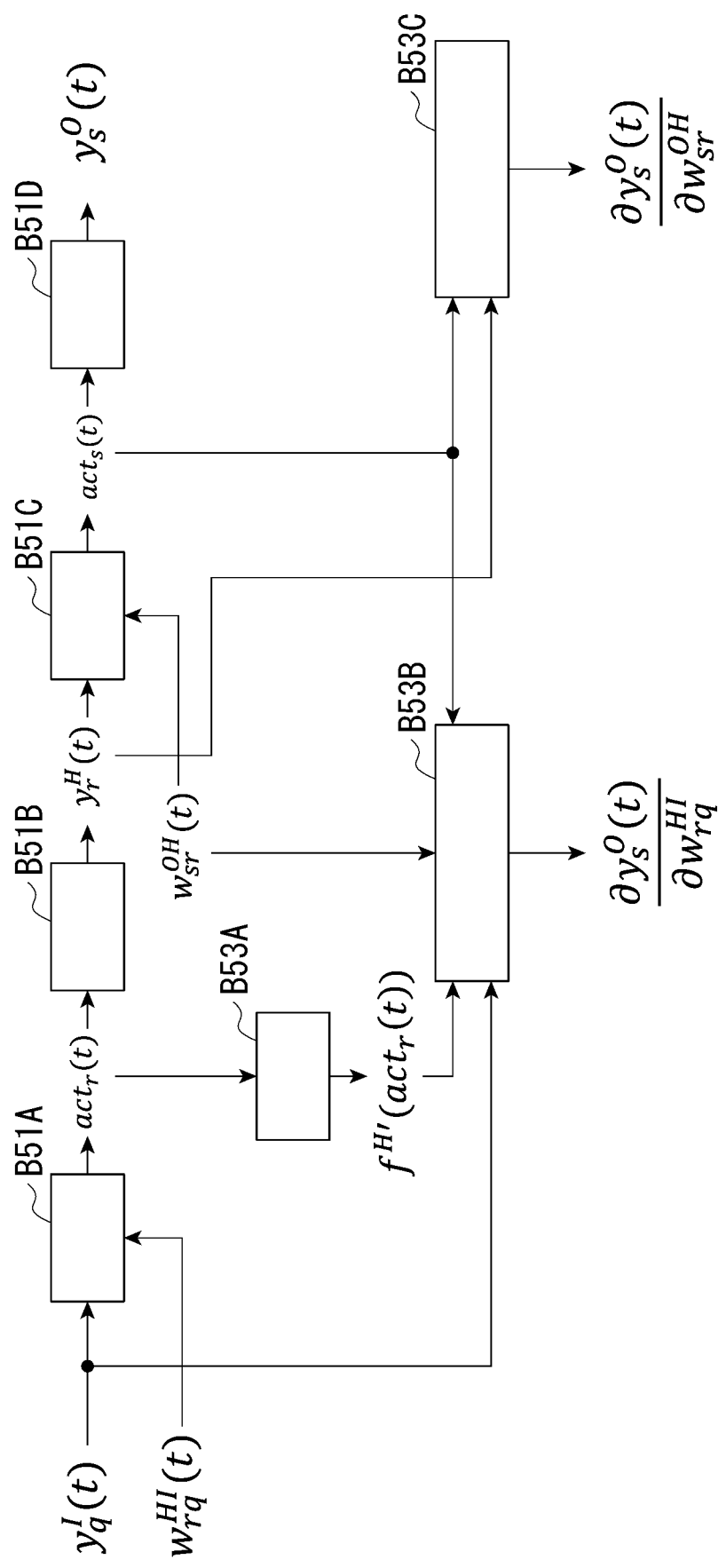
FIG. 7 is a diagram illustrating yet another specific example of the data flow inside the block B5.

FIG. 7 is a diagram illustrating a yet another specific example of the data flow inside the block B5. The data flow illustrated in FIG. 7 is a data flow that is formed in a case in which the 2nd activation function $f^H$ is a segment linear function represented in the following Equation (29) and Equation (30), and the 3rd activation function $f^O$ is a nonlinear function that becomes an identify function when it is differentiated.

[Math. 29]
$$PWL(x) = \begin{cases} -1 & \text{if } x < -2/\gamma \\ \gamma x & \text{if otherwise} \\ 1 & \text{if } x > 2/\gamma \end{cases} \quad (29)$$

[Math. 30]
$$\frac{dPWL(x)}{dx} = \max(0, 1 - \gamma|x|) \quad (30)$$

In Equation (29) and Equation (30) described above, $\gamma$ is a parameter that determines a gain (or a slope) of the 2nd activation function.

The data flow in the output data generating process described above is also included in the data flow illustrated in FIG. 7. When being largely divided, the data flow illustrated in FIG. 7 is composed of 7 blocks including a block B51A to a block B51D and a block B52A to a block B52C. Each of the 7 blocks represents hardware that includes at least one of a near memory and a memory logic. In FIG. 7, the order of a time series in the data flow is represented using a time t. In FIG. 7, similar reference signs will be assigned to blocks that have the same functions as blocks illustrated in FIG. 5 (in other words, the block B51A to the block B51D), and description thereof will be omitted. In FIG. 7, the block B51A outputs $act_r(t)$ to the block B53A. In addition, in FIG. 7 the block B51B outputs a vector $y^H(t)$ to each of the block B51C and the block B53C. In FIG. 7, the block B51C outputs $act_s(t)$ to each of the block B51D, the block B53B, and the block B53C.

The block B53A is a block that performs calculation of $f^{H'}(act_r(t))$ in Equation (23) described above. Here, the block B53A calculates $f^{H'}(act_r(t))$ using the segment linear function represented in Equation (29) described above as the 2nd activation function. $act_r(t)$ output from the block B51A is input to the block B53A. Then, the block B53A calculates $f^{H'}(act_r(t))$ using the function represented in Equation (30) described above as $f^{H'}$. The block B53A outputs $f^{H'}(act_r(t))$ to the block B53B.

The block B53B is a block that performs calculation of Equation (23) described above. In other words, a vector $y^I(t)$, a vector $w^{OH}(t)$, $f^{H'}(act_r(t))$ output from the block B53A, and $act_s(t)$ output from the block B51C are input to the block B53B. Then, the block B53B calculates each component of the left side of Equation (23). The block B53B outputs the calculated each component. In the example illustrated in FIG. 7, as described above, the 3rd activation function $f^O$ is a nonlinear function that becomes an identify function when it is differentiated. For this reason, $f^{O'}(act_s(t))$ used in the block B53B is $act_s(t)$ that is output from the block B51C.

The block B53C is a block that performs calculation of Equation (24) described above. In other words, the vector $y^H(t)$ output from the block B51B and $act_s(t)$ output from the block B51C are input to the block B53C. Then, the block B53C calculates each component of the left side of Equation (24). In the example illustrated in FIG. 7, as described above, the 3rd activation function $f^O$ is a nonlinear function that becomes an identify function when it is differentiated. For this reason, $f^{O'}(act_s(t))$ used in the block B53C is $act_s(t)$ that is output from the block B51C.

In this way, also in the data flow illustrated in FIG. 7, the number of blocks can be configured to be smaller than that of the data flow illustrated in FIG. 5. This means that, in a case in which a Deep FORCE learning unit is implemented on an edge device or the like as hardware including at least one of a near memory and a memory logic, the machine learning device 1 can be designed more simply based on the data flow illustrated in FIG. 7. As a result, in this case, the machine learning device 1 can reduce power consumption, and a memory access speed, a calculation speed, and the like can be increased.

Since the data flow, such as illustrated in FIGS. 5-7, is pre-determined in accordance with a specific architecture of the readout layer, the reconfigurable hardware is preferred. Our proposal on the data flow represented in a forward computational graph in can be mapped on a reconfigurable hardware efficiently on demand depending on the change in the architecture of the readout layer. The expected candidates of the reconfigurable hardware are an FPGA, CGRA, and a customized ASIC.

<Result of Machine Learning Using Machine Learning Device>

Hereinafter, a result of machine learning using the machine learning device 1 will be described.

Figure 8:
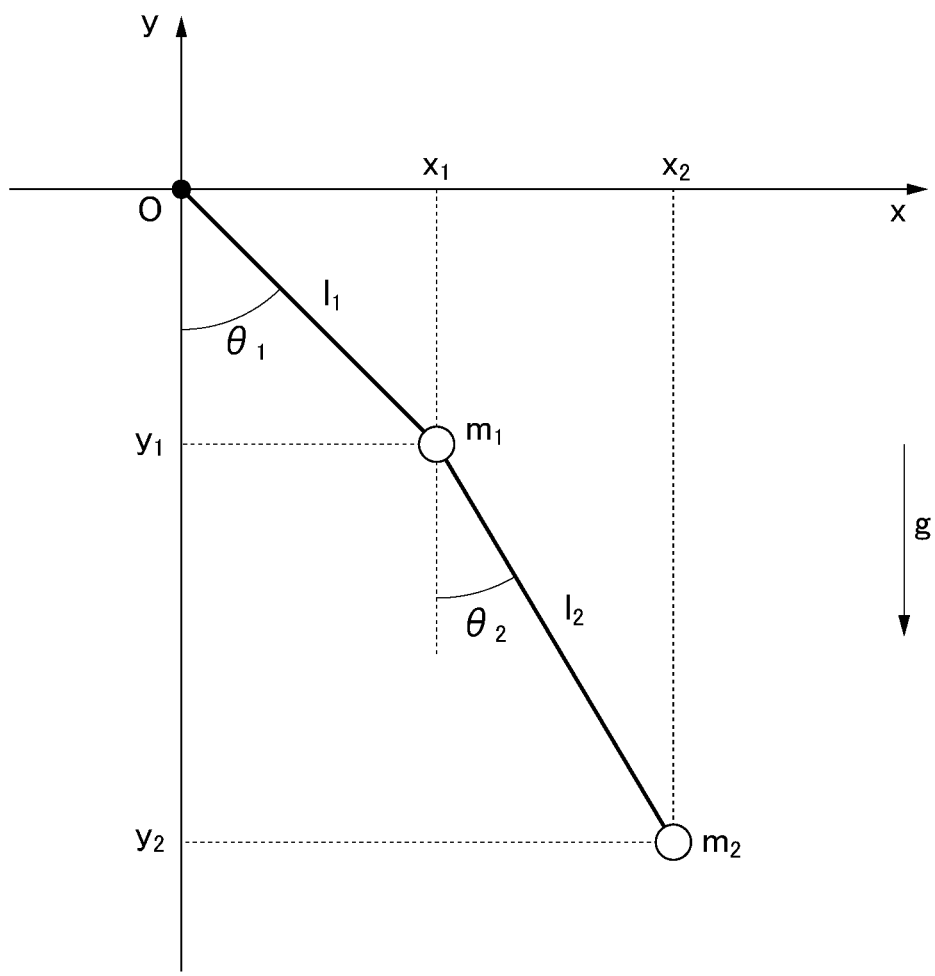
FIG. 8 is a diagram illustrating an example of a double pendulum composed of a 1st weight having a mass m1 connected from the origin using a pole of a length l1 and a 2nd weight having a mass m2 connected with the weight using a pole of a length l2.

Hereinafter, as a result of machine learning using the machine learning device 1, a result of causing the machine learning device 1 to perform machine learning of changes in a displacement of the double pendulum illustrated in FIG. 8 over time will be described as an example. FIG. 8 is a diagram illustrating an example of a double pendulum composed of a 1st weight having a mass m1 connected from the origin using a pole of a length l1 and a 2nd weight having a mass m2 connected with the weight using a pole of a length l2. Changes in the displacements of the 1st weight and the 2nd weight in each of an X-axis direction and a Y-axis direction in the double pendulum illustrated in FIG. 8 over time is deterministically described using an equation of motion. In FIG. 8, a direction in which the force of gravity acts is a direction that is represented by an arrow g.

The equation of motion of the double pendulum illustrated in FIG. 8 can be written for each of the 1st weight and the 2nd weight. At that time, a force in the equation of motion written for each of the 1st weight and the 2nd weight is represented using a function having four parameters including an angle θ1 between a Y axis and a pole 11 illustrated in FIG. 8, an angle θ2 between the Y axis and a pole 12, an angular velocity that is a change in the angle θ1 per unit time, and an angular velocity that is a change in the angle θ2 per unit time.

Thus, these four parameters are detected using sensors in the order of a time series, and the four parameters detected in the order of the time series are input to the machine learning device 1 as four-dimensional input data. At that time, the machine learning device 1 is caused to store teacher data of changes in the displacement of each of the 1st weight and the 2nd weight over time in advance. Then, the machine learning device 1 is caused to perform online learning of changes in the displacement of each of the 1st weight and the 2nd weight over time for a predetermined period. The results thereof are graphs illustrated in FIGS. 9 and 10.

Figure 9:
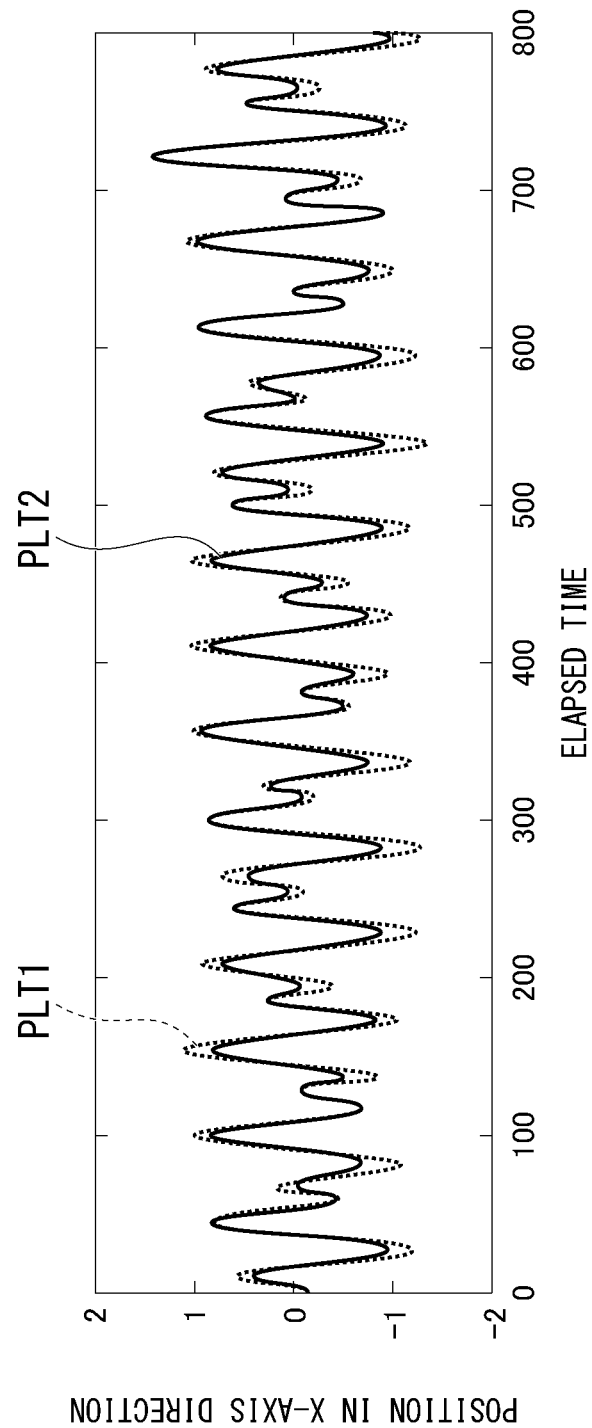
FIG. 9 is a diagram illustrating an example of a graph in which changes in output data output from a machine learning device 1 over time are drawn in a period in which the machine learning device 1 is caused to perform machine learning of changes in a displacement of the 2nd weight in an X-axis direction over time in the double pendulum illustrated in FIG. 8.

FIG. 9 is a diagram illustrating an example of a graph in which changes in output data output from the machine learning device 1 over time are drawn in a period in which the machine learning device 1 is caused to perform machine learning of changes in the displacement of the 2nd weight in an X-axis direction over time in the double pendulum illustrated in FIG. 8. In the graph illustrated in FIG. 9, the vertical axis represents a displacement of the 2nd weight in the X-axis direction. In the graph, the horizontal axis represents an elapsed time. In FIG. 9, the period is represented as a period of elapsed time 0 to elapsed time 800.

In the graph illustrated in FIG. 9, a plot PLT1 is a plot of teacher data. In addition, a plot PLT2 in the graph is a plot of the output data. As illustrated in FIG. 9, the degree of coincidence between output data output from the machine learning device 1 during online learning and teacher data is not that high.

Figure 10:
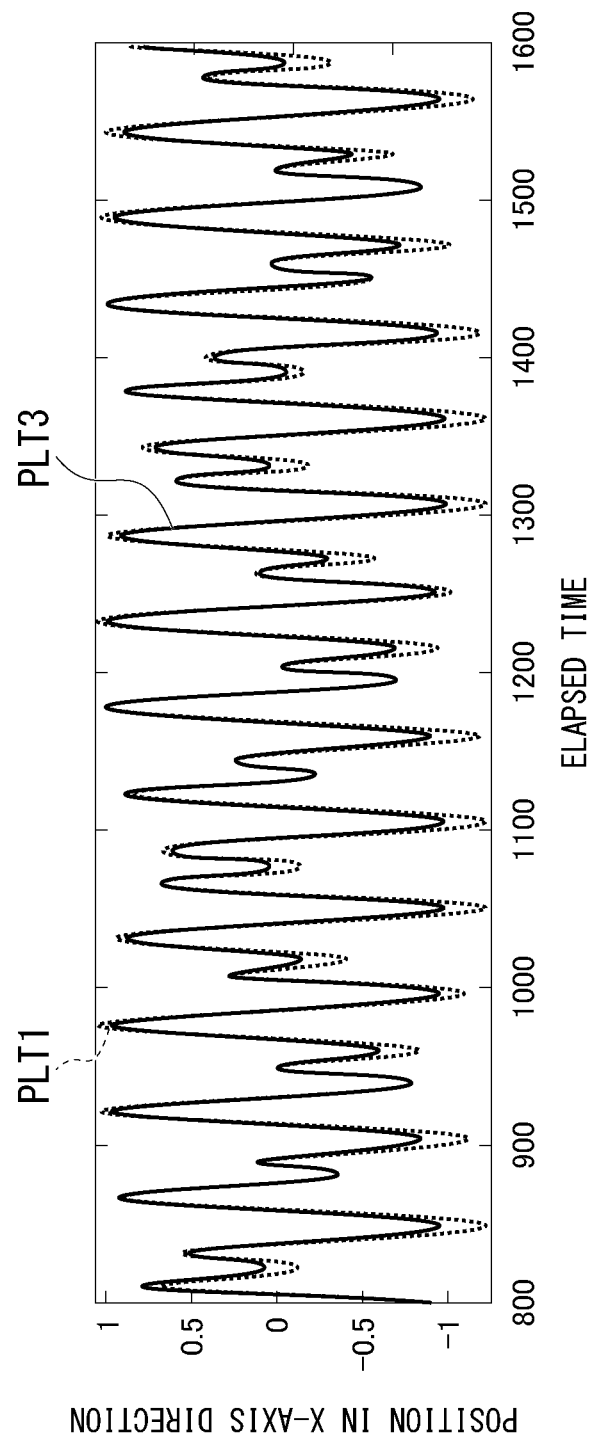
FIG. 10 is a diagram illustrating an example of a graph in which changes in output data output from the machine learning device 1 over time are drawn in a period after the machine learning device 1 is caused to perform machine learning of changes in the displacement of the 2nd weight in the X-axis direction over time in the double pendulum illustrated in FIG. 8.

FIG. 10 is a diagram illustrating an example of a graph in which changes in output data output from the machine learning device 1 over time are drawn in a period after the machine learning device 1 is caused to perform machine learning of changes in the displacement of the 2nd weight in the X-axis direction over time in the double pendulum illustrated in FIG. 8. In the graph illustrated in FIG. 10, the vertical axis represents the displacement of the 2nd weight in the X-axis direction. In the graph, the horizontal axis represents an elapsed time. In FIG. 10, the period is represented as a period of an elapsed time 800 to an elapsed time 1600.

In the graph illustrated in FIG. 10, a plot PLT1 is a plot of teacher data. In addition, in the graph, a plot PLT3 is a plot of output data. As illustrated in FIG. 10, the degree of coincidence between the output data output from the machine learning device 1 after online learning and the teacher data is higher than that before online learning.

Here, the example illustrated in FIGS. 9 and 10 is an example of a result of causing the machine learning device 1 to perform online learning in a case in which the number of 1st intermediate nodes is 100, the number of 2nd intermediate nodes is 10, and the number of the output node is 1. An accuracy of the results of online learning performed by the machine learning device 1 changes in accordance with the numbers of such nodes.

Figure 11:
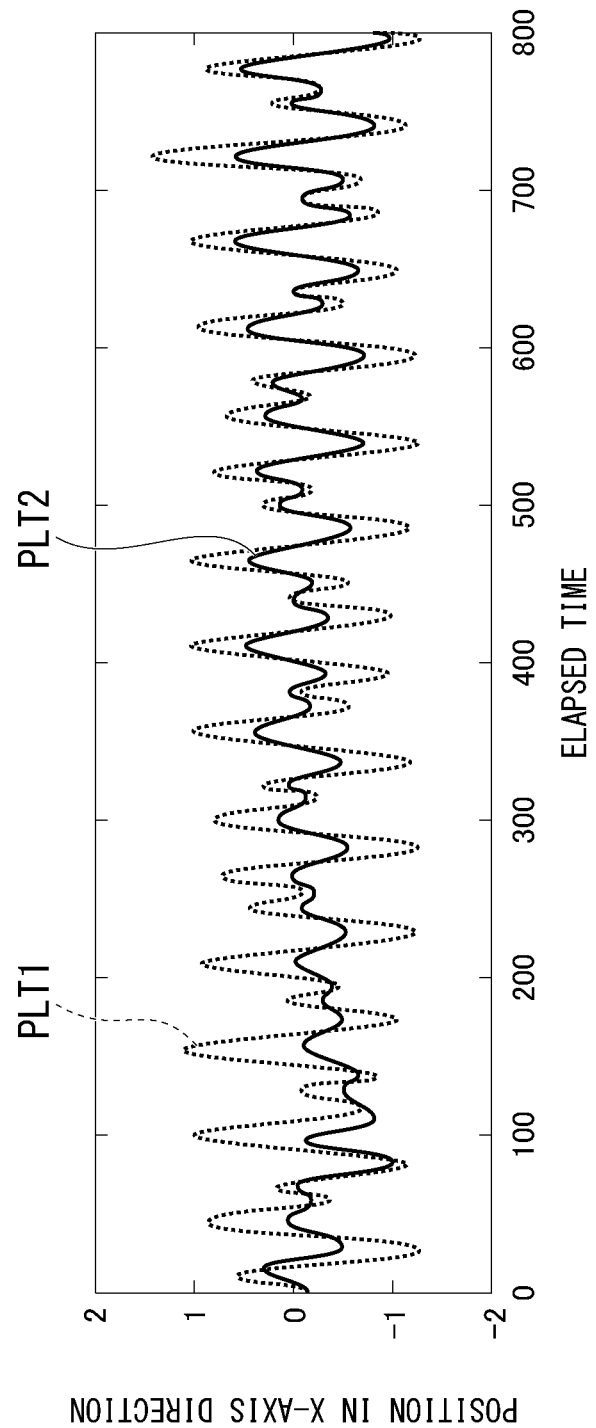
FIG. 11 is a diagram illustrating another example of a graph in which changes in output data output from the machine learning device 1 over time are drawn in a period in which the machine learning device 1 is caused to perform machine learning of changes in the displacement of the 2nd weight in the X-axis direction over time in the double pendulum illustrated in FIG. 8.
Figure 12:
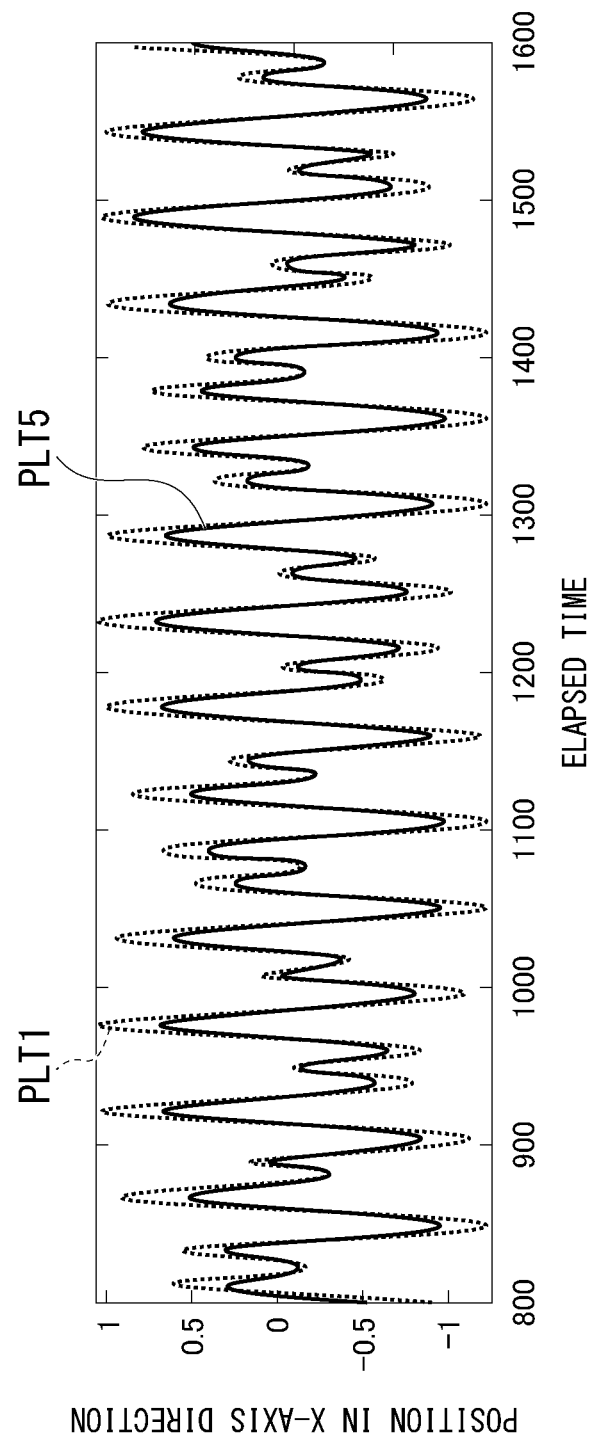
FIG. 12 is a diagram illustrating another example of a graph in which changes in output data output from the machine learning device 1 over time are drawn in a period after the machine learning device 1 is caused to perform machine learning of changes in the displacement of the 2nd weight in the X-axis direction over time in the double pendulum illustrated in FIG. 8.

The example illustrated in FIGS. 11 and 12 is an example of a result of causing the machine learning device 1 to draw graphs similar to the graphs illustrated in FIGS. 9 and 10 in a case in which the number of 1st intermediate nodes is 20, the number of 2nd intermediate nodes is 10, and the number of the output node is 1.

FIG. 11 is a diagram illustrating another example of a graph in which changes in output data output from the machine learning device 1 over time are drawn in a period in which the machine learning device 1 is caused to perform machine learning of changes in the displacement of the 2nd weight in the X-axis direction over time in the double pendulum illustrated in FIG. 8. In the graph illustrated in FIG. 11, the vertical axis represents the displacement of the 2nd weight in the X-axis direction. In the graph, the horizontal axis represents an elapsed time. In FIG. 11, the period is represented as a period of an elapsed time 0 to an elapsed time 800.

In the graph illustrated in FIG. 11, a plot PLT1 is a plot of teacher data. In addition, in the graph, a plot PLT4 is a plot of output data. As illustrated in FIG. 11, the degree of coincidence between the output data output from the machine learning device 1 during online learning and the teacher data is not that high. In addition, as illustrated in FIG. 11, the degree of coincidence between the output data output from the machine learning device 1 during online learning and the teacher data in the example illustrated in FIG. 11 is lower than the degree of coincidence between the output data output from the machine learning device 1 during online learning and the teacher data in the example illustrated in FIG. 9. The reason for this is that the number of 1st intermediate nodes in the example illustrated in FIG. 11 is ⅕ of the number of 1st intermediate nodes in the example illustrated in FIG. 9.

FIG. 12 is a diagram illustrating another example of a graph in which changes in output data output from the machine learning device 1 over time are drawn in a period after the machine learning device 1 is caused to perform machine learning of changes in the displacement of the 2nd weight in the X-axis direction over time in the double pendulum illustrated in FIG. 8. In the graph illustrated in FIG. 12, the vertical axis represents the displacement of the 2nd weight in the X-axis direction. In the graph, the horizontal axis represents an elapsed time. In FIG. 12, the period is represented as a period of an elapsed time 800 to an elapsed time 1600.

In the graph illustrated in FIG. 12, a plot PLT1 is a plot of teacher data. In addition, in the graph, a plot PLT5 is a plot of output data. As illustrated in FIG. 12, the degree of coincidence between the output data output from the machine learning device 1 after online learning and the teacher data is higher than that before the online learning. In addition, as illustrated in FIG. 12, the degree of coincidence between the output data output from the machine learning device 1 during online learning and the teacher data in the example illustrated in FIG. 12 does not change much from that between the output data output from the machine learning device 1 during online learning and the teacher data in the example illustrated in FIG. 10. This means that, even when the number of 1st intermediate nodes in the example illustrated in FIG. 12 is ⅕ of the number of 1st intermediate nodes in the example illustrated in FIG. 9, the accuracy of the online learning performed by the machine learning device 1 is high.

In other words, the machine learning device 1 can improve the accuracy of online learning while the number of 1st intermediate nodes is decreased by using the Deep FORCE learning unit and the weight updating process according to the extended Kalman filter method. As a result, the machine learning device 1 can achieve both a decrease in the manufacturing cost and improvement of the accuracy of the machine learning.

As described above, a machine learning device according to an embodiment is a machine learning device performing machine learning of input data of one or more dimensions aligned in a pre-determined order using a recurrent neural network having a plurality of nodes connected by edges to which weights are assigned, in which, the recurrent neural network has: an input layer having one or more input nodes; a 1st intermediate layer having one or more 1st intermediate nodes; a 2nd intermediate layer having one or more 2nd intermediate nodes; and an output layer having one or more output nodes, the input nodes, the 1st intermediate nodes, the 2nd intermediate nodes, and the output nodes are nodes that are different from each other among the plurality of nodes, the weights assigned to the edges connecting the 1st intermediate nodes are fixed to pre-determined intensity, the machine learning device performs an output data generating process and a weight updating process every time the input layer receives the input data of one or more dimensions in the pre-determined order, the output data generating process is a process in which: a 1st process of outputting the input data of the one or more dimensions received by the input layer from the input layer to the 1st intermediate layer, a 2nd process of outputting 1st intermediate data of one or more dimensions corresponding to the input data of the one or more dimensions input to the 1st intermediate layer in the 1st process from the 1st intermediate layer to the 2nd intermediate layer, a 3rd process of outputting 2nd intermediate data of one or more dimensions corresponding to the 1st intermediate data of the one or more dimensions input to the 2nd intermediate layer in the 2nd process from the 2nd intermediate layer to the output layer, and a 4th process of generating output data of one or more dimensions corresponding to the 2nd intermediate data of the one or more dimensions input to the output layer in the 3rd process are performed in an order of the 1st process, the 2nd process, the 3rd process, and the 4th process, and the weight updating process is a process in which a weight assigned to each edge connecting the 1st intermediate node and the 2nd intermediate node and a weight assigned to each edge connecting the 2nd intermediate node and the output node are updated using an equation derived based on an extended Kalman filter method, the 1st intermediate data of the one or more dimensions, and the output data of the one or more dimensions. In accordance with this, the machine learning device can perform online learning of input data of one or more dimensions aligned in a pre-determined order.

In addition, in the machine learning device, a configuration in which the 1st intermediate layer is a reservoir layer may be used.

In addition, in the machine learning device, a configuration in which a nonlinear function that is an odd function is included in the equation derived based on the extended Kalman filter method as an activation function may be used.

In addition, in the machine learning device, a configuration in which the nonlinear function included in the equation derived based on the extended Kalman filter method is a hyperbolic tangent function may be used.

In addition, in the machine learning device, a configuration in which the equation derived based on the extended Kalman filter method includes an equation for calculating a Kalman gain matrix in the extended Kalman filter method, the machine learning device calculates a Jacobian based on the equation and performs the weight updating process based on the calculated Jacobian may be used.

In addition, in the machine learning device, a configuration in which at least the weight updating process is performed by hardware including at least one of a near memory and a memory logic may be used.

In addition, in the machine learning device, a configuration in which the output data generating process and the weight updating process are performed using the hardware, and a part of the output data generating process and a part of the weight updating process are performed using the hardware that is common may be used.

As described above, a machine learning device according to an embodiment is a machine learning device performing online learning of input data of one or more dimensions aligned in a pre-determined order using a recurrent neural network having a plurality of nodes connected by edges to which weights are assigned, wherein, the recurrent neural network has: an input layer having one or more input nodes; a 1st intermediate layer having one or more 1st intermediate nodes; a 2nd intermediate layer having one or more 2nd intermediate nodes; and an output layer having one or more output nodes, wherein the input nodes, the 1st intermediate nodes, the 2nd intermediate nodes, and the output nodes are nodes that are different from each other among the plurality of nodes, wherein the weights assigned to the edges connecting the 1st intermediate nodes are fixed to pre-determined intensity, wherein the machine learning device performs an output data generating process and a weight updating process every time the input layer receives the input data of one or more dimensions in the pre-determined order, wherein the output data generating process is a process in which: a 1st process of outputting the input data of the one or more dimensions received by the input layer from the input layer to the 1st intermediate layer, a 2nd process of outputting 1st intermediate data of one or more dimensions corresponding to the input data of the one or more dimensions input to the 1st intermediate layer in the 1st process, from the 1st intermediate layer to the 2nd intermediate layer, a 3rd process of outputting 2nd intermediate data of one or more dimensions corresponding to the 1st intermediate data of the one or more dimensions input to the 2nd intermediate layer in the 2nd process, from the 2nd intermediate layer to the output layer, and a 4th process of generating output data of one or more dimensions corresponding to the 2nd intermediate data of the one or more dimensions input to the output layer in the 3rd process are performed in an order of the 1st process, the 2nd process, the 3rd process, and the 4th process, and wherein the weight updating process is a process in which a weight assigned to each edge connecting the 1st intermediate node and the 2nd intermediate node and a weight assigned to each edge connecting the 2nd intermediate node and the output node are updated using an equation derived based on an extended Kalman filter method, the 1st intermediate data of the one or more dimensions, and the output data of the one or more dimensions. In accordance with this, the machine learning device can perform online learning of input data of one or more dimensions aligned in a pre-determined order.

In addition, in the machine learning device, a configuration in which the 1st intermediate layer is a reservoir layer.

In addition, in the machine learning device, a configuration in which the 1st intermediate layer is a Feed-forward layer.

In addition, in the machine learning device, a configuration in which a nonlinear function that is an odd function is included in the equation as an activation function.

In addition, in the machine learning device, a configuration in which the nonlinear function is a hyperbolic tangent function.

In addition, in the machine learning device, a configuration in which the equation include an equation for calculating a Kalman gain matrix in the extended Kalman filter method, and wherein a Jacobian is calculated based on the equation and the weight updating process is performed based on the calculated Jacobian.

In addition, in the machine learning device, a configuration in which each element of the Jacobian matrix is analytically calculated as a functional of an activation of a neuron or an output of a neuron in accordance with a pre-determined feed-forward data flow on a computational graph.

In addition, in the machine learning device, a configuration in which at least the weight updating process is performed using hardware including at least one of a near memory and a memory logic.

In addition, in the machine learning device, a configuration in which the output data generating process and the weight updating process are performed using the hardware, and wherein a part of the output data generating process and a part of the weight updating process are performed using the hardware that is common.

REFERENCE SIGNS LIST

1 Machine learning device
11 Arithmetic operation device
12 Memory
13 Network interface
L1 Input layer
L2 1st intermediate layer
L3 2nd intermediate layer
L4 Output layer

The invention claimed is:

1. A machine learning device performing online learning of input data of one or more dimensions aligned in a pre-determined order using a recurrent neural network having a plurality of nodes connected by edges to which weights are assigned,
wherein the recurrent neural network has:
an input layer having one or more input nodes;
a 1st intermediate layer having one or more 1st intermediate nodes;
a 2nd intermediate layer having one or more 2nd intermediate nodes; and
an output layer having one or more output nodes,
the input nodes, the 1st intermediate nodes, the 2nd intermediate nodes, and the output nodes are nodes that are different from each other among the plurality of nodes,
the weights assigned to the edges connecting the 1st intermediate nodes are fixed to pre-determined intensity,
the machine learning device performs an output data generating process and a weight updating process every time the input layer receives the input data of one or more dimensions in the pre-determined order, using hardware including at least one of a near memory and a memory logic,
a part of the output data generating process and a part of the weight updating process are performed using the hardware that is common,
the output data generating process is a process in which:
a 1st process of outputting the input data of the one or more dimensions received by the input layer from the input layer to the 1st intermediate layer,
a 2nd process of outputting 1st intermediate data of one or more dimensions corresponding to the input data of the one or more dimensions input to the 1st intermediate layer in the 1st process, from the 1st intermediate layer to the 2nd intermediate layer,
a 3rd process of outputting 2nd intermediate data of one or more dimensions corresponding to the 1st intermediate data of the one or more dimensions input to the 2nd intermediate layer in the 2nd process, from the 2nd intermediate layer to the output layer, and
a 4th process of generating output data of one or more dimensions corresponding to the 2nd intermediate data of the one or more dimensions input to the output layer in the 3rd process are performed in an order of the 1st process, the 2nd process, the 3rd process, and the 4th process,
the weight updating process is a process in which a weight assigned to each edge connecting the 1st intermediate node and the 2nd intermediate node and a weight assigned to each edge connecting the 2nd intermediate node and the output node are updated using an equation derived based on an extended Kalman filter method, the 1st intermediate data of the one or more dimensions, and the output data of the one or more dimensions,
the equation include an equation for calculating a Kalman gain matrix in the extended Kalman filter method,
the hardware is including a Jacobian calculating hardware that calculates a Jacobian based on the equation, and a weight updating hardware that performs the weight update process based on the Jacobian calculated by the Jacobian calculation hardware,
the Jacobian calculating hardware is including:
a 1st hardware configured to be input the 1st intermediate data and to output a 1st function that is a function multiplying the input 1st intermediate data with the 1st weight,
a 2nd hardware configured to be input the 1st function output from the 1st hardware and to input the input 1st function to a 1st activation function, to output the 2nd intermediate data,
a 3rd hardware configured to be input the 2nd intermediate data output from the 2nd hardware, and to input a 2nd function that is a function multiplying the input 2nd intermediate data with the 2nd weight to a 2nd activation function, and to output the 2nd activation function as the output data,
a 4th hardware configured to be input the 2nd intermediate data output from the 2nd hardware and to output a derivative of the input second intermediate data,
a 5th hardware configured to be input the 1st intermediate data, the derivative of the 2nd intermediate data output from the 4th hardware, and the 1st weight, to multiply the input 1st intermediate data, the input derivative of the 2nd intermediate data, the input 1st weight and to output a parts of a components included in the Jacobian,
a 6th hardware configured to be input the output data output from the 3rd hardware, to multiply the input output data and a derivative of the 2nd activation function, and to output the other parts of the components included in the Jacobian,
the 1st activation function is a hyperbolic tangent function, and
the 2nd activation function is an identify function.

2. The machine learning device according to claim 1, wherein the 1st intermediate layer is a reservoir layer.

3. The machine learning device according to claim 1, wherein the 1st intermediate layer is a feed-forward layer.

4. A machine learning method causing a machine learning device to perform online learning of input data of one or more dimensions aligned in a pre-determined order using a recurrent neural network having a plurality of nodes connected by edges to which weights are assigned,
wherein the recurrent neural network has:
an input layer having one or more input nodes;
a 1st intermediate layer having one or more 1st intermediate nodes;
a 2nd intermediate layer having one or more 2nd intermediate nodes; and
an output layer having one or more output nodes,
the input nodes, the 1st intermediate nodes, the 2nd intermediate nodes, and the output nodes are nodes that are different from each other among the plurality of nodes,
the weights assigned to the edges connecting the 1st intermediate nodes are fixed to pre-determined intensity,
the machine learning method is a method of causing the machine learning device to perform an output data generating process and a weight updating process every time the input layer receives the input data of one or more dimensions in the pre-determined order, using hardware including at least one of a near memory and a memory logic,
a part of the output data generating process and a part of the weight updating process are performed using the hardware that is common,
the output data generating process is a process in which:
a 1st process of outputting the input data of the one or more dimensions received by the input layer, from the input layer to the 1st intermediate layer,
a 2nd process of outputting 1st intermediate data of one or more dimensions corresponding to the input data of the one or more dimensions input to the 1st intermediate layer in the 1st process, from the 1st intermediate layer to the 2nd intermediate layer,
a 3rd process of outputting 2nd intermediate data of one or more dimensions corresponding to the 1st intermediate data of the one or more dimensions input to the 2nd intermediate layer in the 2nd process, from the 2nd intermediate layer to the output layer, and
a 4th process of generating output data of one or more dimensions corresponding to the 2nd intermediate data of the one or more dimensions input to the output layer in the 3rd process are performed in an order of the 1st process, the 2nd process, the 3rd process, and the 4th process, and the weight updating process is a process in which a weight assigned to each edge connecting the 1st intermediate node and the 2nd intermediate node and a weight assigned to each edge connecting the 2nd intermediate node and the output node are updated using an equation derived based on an extended Kalman filter method, the 1st intermediate data of the one or more dimensions, and the output data of the one or more dimensions, the equation include an equation for calculating a Kalman gain matrix in the extended Kalman filter method, the hardware is including a Jacobian calculating hardware that calculates a Jacobian based on the equation, and a weight updating hardware that performs the weight update process based on the Jacobian calculated by the Jacobian calculation hardware, the Jacobian calculating hardware is including:
a 1st hardware configured to be input the 1st intermediate data and to output a 1st function that is a function multiplying the input 1st intermediate data with the 1st weight,
a 2nd hardware configured to be input the 1st function output from the 1st hardware and to input the input 1st function to a 1st activation function, to output the 2nd intermediate data,
a 3rd hardware configured to be input the 2nd intermediate data output from the 2nd hardware, and to input a 2nd function that is a function multiplying the input 2nd intermediate data with the 2nd weight to a 2nd activation function, and to output the 2nd activation function as the output data,
a 4th hardware configured to be input the 2nd intermediate data output from the 2nd hardware and to output a derivative of the input second intermediate data,
a 5th hardware configured to be input the 1st intermediate data, the derivative of the 2nd intermediate data output from the 4th hardware, and the 1st weight, to multiply the input 1st intermediate data, the input derivative of the 2nd intermediate data, the input 1st weight and to output a parts of a components included in the Jacobian,
a 6th hardware configured to be input the output data output from the 3rd hardware, to multiply the input output data and a derivative of the 2nd activation function, and to output the other parts of the components included in the Jacobian,
the 1st activation function is a hyperbolic tangent function, and
the 2nd activation function is an identify function.

* * * * *